United States Patent
Umebayashi

(10) Patent No.: US 9,688,870 B2
(45) Date of Patent: Jun. 27, 2017

(54) RADIATION CURABLE TYPE INK JET INK SET AND INK JET RECORDING METHOD

(71) Applicant: FUJIFILM Corporation, Tokyo (JP)

(72) Inventor: Tsutomu Umebayashi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/222,304

(22) Filed: Jul. 28, 2016

(65) Prior Publication Data

US 2016/0333201 A1 Nov. 17, 2016

Related U.S. Application Data

(63) Continuation of application No. PCT/JP2014/080705, filed on Nov. 20, 2014.

(30) Foreign Application Priority Data

Feb. 13, 2014 (JP) ................. 2014-024981

(51) Int. Cl.
| | | |
|---|---|---|
| B41J 2/21 | (2006.01) |
| C09D 11/03 | (2014.01) |
| C09D 11/037 | (2014.01) |
| C09D 11/326 | (2014.01) |
| C09D 11/40 | (2014.01) |
| B41M 7/00 | (2006.01) |
| C09D 11/101 | (2014.01) |
| C09D 11/322 | (2014.01) |
| B41J 11/00 | (2006.01) |
| C08G 81/02 | (2006.01) |
| C09B 67/46 | (2006.01) |
| C09D 11/107 | (2014.01) |

(52) U.S. Cl.
CPC ............ C09D 11/03 (2013.01); B41J 2/2107 (2013.01); B41J 11/0015 (2013.01); B41M 7/0081 (2013.01); C08G 81/025 (2013.01); C09B 67/009 (2013.01); C09D 11/037 (2013.01); C09D 11/101 (2013.01); C09D 11/107 (2013.01); C09D 11/322 (2013.01); C09D 11/326 (2013.01); C09D 11/40 (2013.01)

(58) Field of Classification Search
CPC ..... C09D 11/037; C09D 11/03; C09D 11/101; C09D 11/322; C09D 11/326; C09D 11/40; B41J 2/2107
See application file for complete search history.

(56) References Cited

U.S. PATENT DOCUMENTS

| | | |
|---|---|---|
| 7,311,769 B2 | 12/2007 | Weber et al. |
| 7,795,323 B2 | 9/2010 | Takabayashi |
| 8,420,714 B2 | 4/2013 | Umebayashi |
| 2007/0281245 A1* | 12/2007 | Overend ............ C09D 11/101 430/281.1 |
| 2014/0368591 A1 | 12/2014 | Umebayashi |

FOREIGN PATENT DOCUMENTS

| | | |
|---|---|---|
| EP | 2216377 A1 | 8/2010 |
| EP | 2684922 A1 | 1/2014 |
| EP | 2832803 A1 | 2/2015 |
| JP | 2002-526254 A | 8/2002 |
| JP | 2005-105225 A | 4/2005 |
| JP | 2006-027071 A | 3/2006 |
| JP | 2006-241383 A | 9/2006 |
| JP | 2007-514804 A | 6/2007 |
| JP | 2007-261206 A | 10/2007 |
| JP | 2007-291342 A | 11/2007 |
| JP | 2008-208189 A | 9/2008 |
| JP | 2009-221374 A | 10/2009 |
| JP | 2010-180376 A | 8/2010 |
| JP | 2011-084727 A | 4/2011 |
| JP | 2012-203146 A | 10/2012 |
| JP | 5156964 B1 | 3/2013 |
| JP | 2013-213196 A | 10/2013 |
| WO | 2007/029448 A1 | 3/2007 |
| WO | 2013/133123 A1 | 9/2013 |
| WO | 2013/146722 A1 | 10/2013 |

OTHER PUBLICATIONS

Written Opinion—PCT/JP2014/080705 mailed Feb. 24, 2015.
International Search Report—PCT/JP2014/080705 mailed Feb. 24, 2015.
The extended European search report issued by the European Patent Office on Jan. 19, 2017, which corresponds to European Patent Application No. 14882564.9-1302 and is related to U.S. Appl. No. 15/222,304.
The Second Notice of Opinion of Examination issued by the State Intellectual Property Office of People's Republic of China on Feb. 16, 2017, which corresponds to Chinese Patent Application No. 201480075250.X and is related to U.S. Appl. No. 15/222,304; with English language translation.
The First Office Action issued by the State Intellectual Property Office of People's Republic of China on Dec. 7, 2016, which corresponds to Chinese Patent Application No. 201480075250.X and is related to U.S. Appl. No. 15/222,304; with English language translation.

* cited by examiner

*Primary Examiner* — Julian Huffman
(74) *Attorney, Agent, or Firm* — Studebaker & Brackett PC

(57) ABSTRACT

A radiation curable type ink jet ink set contains a magenta ink which contains C. I. Pigment Red 57:1 in an amount of 2.0% by mass to 4.0% by mass and a yellow ink which contains C. I. Pigment Yellow 185 in an amount of 1.5% by mass to 4.0% by mass. An ink jet recording method includes a jetting step of jetting the yellow ink and/or the magenta ink contained in the radiation curable type ink jet ink set onto a substrate from an ink jet recording head, and a curing step of curing the magenta ink and/or the yellow ink by radiation irradiation.

21 Claims, No Drawings

RADIATION CURABLE TYPE INK JET INK SET AND INK JET RECORDING METHOD

CROSS-REFERENCE TO RELATED APPLICATIONS

This application is a Continuation of PCT International Application No. PCT/JP2014/080705 filed on Nov. 20, 2014, which claims priority under 35 U.S.C §119(a) to Japanese Patent Application No. 2014-024981 filed on Feb. 13, 2014. Each of the above application(s) is hereby expressly incorporated by reference, in its entirety, into the present application.

BACKGROUND OF THE INVENTION

1. Field of the Invention

The present invention relates to a radiation curable type ink jet ink set and an ink jet recording method.

2. Description of the Related Art

The ink jet methods in which an ink composition is jetted in the form of liquid droplets from an ink jet nozzle use a small device, are inexpensive, and enable the formation of an image on a recording medium in a non-contact manner. Therefore, the ink jet methods are used in many printers. Among the ink jet methods, a piezoelectric ink jet method, in which an ink is jetted by utilizing the deformation of a piezoelectric element, and a thermal ink jet method, in which an ink composition is jetted in the form of liquid droplets by utilizing the boiling phenomenon of the ink composition caused by thermal energy, feature high resolution and excellent high-speed printing properties.

In recent years, not only photo printing or document printing for home use or office use, but also commercial printing or industrial printing using ink jet printers have been developed. Particularly, there is a rapidly increasing demand for a wide format ink jet printer which is suitable for printing a large size advertisement stuck to show windows, walls of buildings, and the like. The large size advertisement is used mainly outdoors in many cases and thus is required to exhibit weather fastness over a long period of time. Accordingly, as a substrate thereof, vinyl chloride and the like are widely used. In addition, as pigments for the large size advertisement, ultraviolet curable type ink jet inks (UV ink jet inks) using those excellent in weather fastness (against light, rain, and wind) such as a pigment (mainly used as a yellow pigment) having an azo skeleton, a quinacridone pigment (mainly used as a magenta pigment), a copper phthalocyanine pigment (mainly used as a cyan pigment), and carbon black (mainly used as a black pigment) are widely used.

Furthermore, for full color printing, an ink jet ink set as a combination of 4 color inks consisting of three subtractive primary color inks of yellow, magenta, and cyan plus a black ink is used.

Examples of ink compositions of the related art include those described in WO2007/029448A, JP2005-105225A, JP2010-180376A, JP2007-514804A, and JP2013-213196A.

SUMMARY OF THE INVENTION

Meanwhile, in recent years, the large size advertisement has been displayed not only in the outdoor environment but also in stores, station premises, and the like. Furthermore, for printed materials for indoor use that are used mainly indoors, corrugated board printing, seal/label printing, and the like, ink jet printing has been used.

The inventor of the present invention found that the characteristics required for the ink jet used for printing for indoor use are different from the characteristics required for the outdoor advertisement. That is, a radiation curable type ink jet ink set used mainly indoors for printed materials needs to additionally have the following characteristics.

In other words, because an observer observes a printed material at a close distance indoors, the color reproduction range thereof needs to be wider than that of the printed material of the related art. Particularly, the widening of the color reproduction range is strongly required for red and blue at high concentration (L value of equal to or less than 50).

Objects of the present invention are to provide a radiation curable type ink jet ink set having a sufficiently wide color reproduction range particularly for red and blue at high concentration (L value of equal to or less than 50) and to provide an ink jet recording method using the ink set.

The above objects were accomplished by means described in the following <1> or <14>. Furthermore, preferred embodiments are described in <2> to <13> and <15> below.

<1> A radiation curable type ink jet ink set comprising a magenta ink which contains C. I. Pigment Red 57:1 in an amount of 2.0% by mass to 4.0%/o by mass and a yellow ink which contains C. I. Pigment Yellow 185 in an amount of 1.5% by mass to 4.0% by mass.

<2> The radiation curable type ink jet ink set described in <1>, in which both of the magenta ink and the yellow ink contain a polymer dispersant having an amine value of 35 mgKOH/g to 45 mgKOH/g.

<3> The radiation curable type ink jet ink set described in <2>, in which the polymer dispersant is a copolymer having a monomer unit represented by the following Formula (1).

<4> The radiation curable type ink jet ink set described in <2> or <3>, in which the polymer dispersant is a copolymer having a monomer unit represented by the following Formula (1), a monomer unit represented by the following Formula (2), and a monomer unit represented by the following Formula (3).

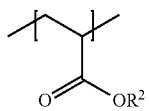

(3)

In the formulae, $R^1$ represents an alkyl group having 2 to 15 carbon atoms, and $R^2$ represents a polyalkylene oxide group having 10 to 50 carbon atoms that has a hydroxy group or an alkoxy group on a terminal.

<5> The radiation curable type ink jet ink set described in <3> or <4>, in which in a case where the total content of the monomer units constituting the polymer dispersant is 100 mol %, the content of the monomer unit represented by Formula (1) in the polymer dispersant is 10 mol % to 30 mol %.

<6> The radiation curable type ink jet ink set described in any one of <2> to <5>, in which in a case where the content of C. I. Pigment Red 57:1 or C. I. Pigment Yellow 185 is denoted as Mp, and the content of the polymer dispersant is denoted as Md, a mass ratio of Md/Mp in each of the magenta ink and the yellow ink is 0.2 to 0.5.

<7> The radiation curable type ink jet ink set described in any one of <1> to <6>, in which both of the magenta ink and the yellow ink further contain a polyfunctional ethylenically unsaturated compound having one or more vinyl ether groups.

<8> The radiation curable type ink jet ink set described in <7>, in which the polyfunctional ethylenically unsaturated compound having one or more vinyl ether groups is a polyfunctional ethylenically unsaturated compound having two or more vinyl ether groups.

<9> The radiation curable type ink jet ink set described in any one of <1> to <8>, in which both of the magenta ink and the yellow ink further contain 3-methyl-1,5-pentanediol diacrylate.

<10> The radiation curable type ink jet ink set described in <9>, in which the content of the 3-methyl-1,5-pentanediol diacrylate in each of the magenta ink and the yellow ink is equal to or greater than 50% by mass.

<11> The radiation curable type ink jet ink set described in <9> or <10>, in which the content of the 3-methyl-1,5-pentanediol diacrylate in each of the magenta ink and the yellow ink is 50% by mass to 75% by mass.

<12> The radiation curable type ink jet ink set described in any one of <1> to <11>, in which both of the magenta ink and the yellow ink further contain a trifunctional (meth) acrylate compound.

<13> The radiation curable type ink jet ink set described in any one of <1> to <12> that is a radiation curable type ink jet ink set for a printed material used indoors.

<14> An ink jet recording method comprising (1) jetting the magenta ink and/or the yellow ink contained in the radiation curable type ink jet ink set described in any one of <1> to <13> onto a substrate from an ink jet recording head, and (2) curing the jetted magenta ink and/or the yellow ink by radiation irradiation.

<15> The ink jet recording method described in <14>, in which a printed material for indoor use is obtained.

According to the present invention, it is possible to provide a radiation curable type ink jet ink set having a sufficiently wide color reproduction range particularly for red and blue at high concentration (L value of equal to or less than 50) and to provide an ink jet recording method.

DESCRIPTION OF THE PREFERRED EMBODIMENTS

A radiation curable type ink jet ink set of the present invention (hereinafter, simply referred to as an "ink set" as well) contains a magenta ink, which contains C. I. Pigment Red 57:1 (hereinafter, referred to as "PR 57:1" as well) in an amount of 2.0% by mass to 4.0% by mass, and a yellow ink, which contains C. I. Pigment Yellow 185 (hereinafter, referred to as "PY 185" as well) in an amount of 1.5% by mass to 4.0% by mass.

The ink set of the present invention contains the magenta ink and the yellow ink as essential inks. If necessary, it is preferable that either or both of radiation curable type cyan ink and black ink are concurrently used.

The ink set of the present invention can be suitably used as a radiation curable type ink jet ink set for a printed material used indoors.

Furthermore, the ink set of the present invention can be suitably used as a radiation curable type ink jet ink set used for printing performed on seals, labels, plastic containers (paper containers, soft packages, and the like) of foods or toiletries, corrugated boards, and the like. In addition, the ink set of the present invention can be more suitably used as a radiation curable type ink jet ink set for corrugated boards, seals, and labels, and can be even more suitably used as a radiation curable type ink jet ink set for seals and labels.

Even in a case where the ink set of the present invention is used for a printed material used in an indoor environment in which an observer observes the printed material at a close distance, because the ink set has a wide color reproduction range particularly for red and blue at high concentration (L value of equal to or less than 50), the ink set can form a high-quality printed material having a vivid color and makes it possible to obtain a printed material that still looks beautiful even if the observer watches it closely.

Hereinafter, the present invention will be specifically described.

In the present specification, the description of "the lower limit to the upper limit" represents "equal to or greater than the lower limit and equal to or less than the upper limit", and the description of "the upper limit to the lower limit" represents "equal to or less than the upper limit and equal to or greater than the lower limit". That is, the descriptions represent a range of numerical values including the upper limit and the lower limit. Unless otherwise specified, the "molecular weight" of a polymer compound means a "weight-average molecular weight". Furthermore, "part by mass" and "% by mass" have the same definition as "part by weight" and "% by weight" respectively.

(1) Radiation Curable Type Ink Jet Ink Set

In the present invention, an "ink" means an "ink composition" and contains a radiation curable type compound in addition to a coloring pigment. Furthermore, in the present invention, an "ink set" contains, as essential coloring inks, a magenta ink containing PR 57:1 as a magenta pigment and a yellow ink containing PY 185 as a yellow pigment, and can contain inks of other colors as optional components.

In addition, in the ink set of the present invention, both of the yellow ink and the magenta ink have radiation curing properties and are suitably used as an ink composition for ink jet recording.

In the ink set of the present invention, both of the yellow ink and the magenta ink are an ink composition which can be cured by radiation and an oil-based ink composition.

The "radiation" mentioned in the present invention is not particularly limited as long as it is energy-suppliable active radiation that can generate an initiation species in an ink by the radiation irradiation. In a broad sense, the radiation includes α rays, γ rays, X rays, ultraviolet rays (UV), visible rays, electron beam, and the like. Among these, from the viewpoint of curing sensitivity and ease of availability of the device, ultraviolet rays and electron beam are preferable, and ultraviolet rays are particularly preferable. Accordingly, each color ink in the ink set of the present invention is preferably an ink composition which can be cured by being irradiated with ultraviolet rays as radiation.

In the present invention, in a case where either or both of "acrylate" and "methacrylate" are mentioned, a description of "(meth)acrylate" is used, and in a case where either or both of "acryl" and "methacryl" are mentioned, a description of "(meth)acryl" is used.

(Magenta Pigment)

The radiation curable type ink jet ink set of the present invention contains a magenta ink containing C. I. Pigment Red 57:1 in an amount of 2.0% by mass to 4.0% by mass.

The content of the C. I. Pigment Red 57:1 is preferably 2.5% by mass to 3.5% by mass with respect to the total amount of the magenta ink. In the ink set of the present invention, in addition to the general magenta ink containing a pigment in the amount described above, other magenta inks containing pigments in an amount smaller than the above can also be concurrently used as light magenta color inks.

As PR 57:1, it is possible to suitably use products from which a dispersion having a particle size distribution, in which $D_{v90}$ as a particle size measured by a laser diffraction method is equal to or greater than 0.1 μm and equal to or less than 0.3 μm, is obtained. In the above particle size distribution, the jetting stability of the ink jet becomes excellent, and the fluidity becomes excellent within the range of the pigment concentration described above. As commercially available products, it is possible to preferably use Irgalite Rubine D4240, Irgalite Rubine D4242, or Irgalite Rubine D4280 manufactured by BASF Corporation.

Herein, the dispersion is a material obtained by medium dispersion using zirconia beads described in examples, and the laser diffraction method complies with the common method.

The magenta ink contains, as a magenta pigment, PR 57:1 preferably in an amount of equal to or greater than 80% by mass, more preferably in an amount of equal to or greater than 90% by mass, and particularly preferably in an amount of equal to or greater than 99% by mass, with respect to the total amount of magenta pigments.

Examples of red or magenta pigments that may be concurrently used as trace components in the magenta ink used in the present invention include the following pigments. In the present invention, in a case where those other pigments are concurrently used in addition to PR 57:1, the content thereof is preferably less than 20% by mass, more preferably less than 10% by mass, even more preferably less than 1% by mass, and particularly preferably 0% by mass.

Examples of the pigments of a red or magenta color include a monoazo-based pigment such as C. I. Pigment Red 3 (toluidine red or the like), a disazo pigment such as C. I. Pigment Red 38 (pyrazolone red B or the like), an azo lake pigment such as C. I. Pigment Red 53:1 (lake red C or the like), a condensed azo pigment such as C. I. Pigment Red 144 (condensed azo red BR or the like), an acidic dye lake pigment such as C. I. Pigment Red 174 (phloxine B lake or the like), a basic dye lake pigment such as C. I. Pigment Red 81 (rhodamine 6G' lake or the like), an anthraquinone-based pigment such as C. I. Pigment Red 177 (dianthraquinonyl red or the like), a thioindigo pigment such as C. I. Pigment Red 88 (thioindigo bordeaux or the like), a perinone pigment such as C. I. Pigment Red 194 (perinone red or the like), a perylene pigment such as C. I. Pigment 149 (perylene scarlet or the like), a quinacridone pigment such as C. I. Pigment Violet 19 (unsubstituted quinacridone) or C. I. Pigment Red 122 (quinacridone magenta or the like), an isoindolinone pigment such as C. I. Pigment Red 180 (isoindolinone red 2BLT or the like), an alizarin lake pigment such as C. I. Pigment Red 83 (madder lake or the like), and the like.

(Yellow Pigment)

The radiation curable type ink jet ink set of the present invention contains a yellow ink containing C. I. Pigment Yellow 185 in an amount of 1.5% by mass to 4.0% by mass.

The content of C. I. Pigment Yellow 185 is preferably 1.8% by mass to 2.2% by mass with respect to the total amount of the yellow ink. In the ink set of the present invention, in addition to the general yellow ink containing a pigment in the amount described above, as light color inks, other yellow inks containing pigments in an amount smaller than the above range can also be concurrently used.

As PY 185, it is possible to suitably use products from which a dispersion having a particle size distribution, in which $D_{v90}$ as a particle size measured by a laser diffraction method is equal to or greater than 0.1 μm and equal to or less than 0.3 μm, is obtained. In the above particle size distribution, the jetting stability of the ink jet becomes excellent, and the fluidity becomes excellent within the range of the pigment concentration described above. As commercially available products, it is possible to preferably use Paliotol Yellow D 1155 or Paliotol Yellow L 1155 manufactured by BASF Corporation.

Herein, the dispersion is a material obtained by medium dispersion using zirconia beads described in examples, and the laser diffraction method complies with the common method.

The yellow ink contains, as a yellow pigment, PY 185 preferably in an amount of equal to or greater than 80% by mass, more preferably in an amount of equal to or greater than 90% by mass, and particularly preferably in an amount of equal to or greater than 99% by mass, with respect to the total amount of yellow pigments.

Examples of yellow pigments that may be concurrently used as trace components in the yellow ink used in the present invention include the following pigments. In the present invention, in a case where those other pigments are concurrently used in addition to PY 185, the content thereof is preferably less than 20% by mass, more preferably less than 10% by mass, even more preferably less than 1% by mass, and particularly preferably 0% by mass.

Specific examples of organic and inorganic pigments that can be used concurrently with PY 185 in the present invention include pigments of yellow color including a monoazo pigment such as C. I. Pigment Yellow 1 (first yellow G or the like) or C. I. Pigment Yellow 74, a disazo pigment such as C. I. Pigment Yellow 12 (disazo yellow AAA or the like) or C. I. Pigment Yellow 17, a non-benzidine-based azo pigment such as C. I. Pigment Yellow 180, an azo lake pigment such as C. I. Pigment Yellow 100 (tartrazine yellow lake or the like), a condensed azo pigment such as C. I. Pigment Yellow 95 (condensed azo yellow GR or the like), an acidic dye lake pigment such as C. I. Pigment Yellow 115 (quinoline yellow lake or the like), a basic dye lake pigment such as C. I. Pigment Yellow 18 (thioflavin lake or the like), an anthraquinone-based pigment such as flavanthrone yellow (Y-24), an isoindolinone pigment such as isoindolinone yellow 3RLT (Y-110), a quinophthalone pigment such as quinophthalone yellow (Y-138), an isoindoline pigment such as isoindoline yellow (Y-139), a nitroso pigment such as C. I. Pigment Yellow 153 (nickel nitroso yellow or the like), a metal complex salt azomethine pigment such as C. I. Pigment Yellow 117 (copper azomethine yellow or the like), and the like.

(Cyan Pigment and Black Pigment)

In a case where the ink set of the present invention is used for full color printing, in addition to the magenta ink and the yellow ink described above, it is preferable to concurrently use a cyan ink and a black ink. As the cyan ink and the black ink, the pigments exemplified below can be used.

Examples of pigments of cyan or blue color include a disazo-based pigment such as C. I. Pigment Blue 25 (dianisidine blue or the like), a phthalocyanine pigment such as C. I. Pigment Blue 15 (phthalocyanine blue or the like), an acidic dye lake pigment such as C. I. Pigment Blue 24 (peacock blue lake or the like), a basic dye lake pigment such as C. I. Pigment Blue 1 (Victoria pure blue BO lake or the like), an anthraquinone-based pigment such as C. I. Pigment Blue 60 (indanthrone blue or the like), an alkali blue pigment such as C. I. Pigment Blue 18 (alkali blue V-5:1), and the like.

Examples of pigments of black color include carbon black, titanium black, aniline black, and the like, and among these, carbon black is preferable.

In the ink set of the present invention, inks of other colors selected from the following group can be used according to the purpose of use. Examples of the inks of other colors include a white ink, an orange ink, a violet ink, a green ink, and a clear ink. Herein, the radiation curable type ink jet ink set of the present invention is preferably constituted with 4 color inks including a magenta ink containing PR 57:1 as a pigment, a yellow ink containing PY 185 as a pigment, a cyan ink, and a black ink, and more preferably constituted with 5 color inks including a white ink in addition to the above 4 inks.

As described above, in the ink set of the present invention, if necessary, in addition to three subtractive primary color inks of yellow, magenta, and cyan, so-called special color inks of violet and orange may be used as coloring inks.

Examples of pigments of green color include a phthalocyanine pigment such as C. I. Pigment Green 7 (phthalocyanine green) or C. I. Pigment Green 36 (phthalocyanine green), an azo metal complex pigment such as C. I. Pigment Green 8 (nitroso green), and the like.

Examples of pigments of violet include C. I. Pigment Violet 19 (unsubstituted quinacridone).

Examples of pigments of orange color include an isoindoline-based pigment such as C. I. Pigment Orange 66 (isoindoline orange) and an anthraquinone-based pigment such as C. I. Pigment Orange 51 (dichloropyranthrone orange).

(Pigment Dispersant)

In the ink set of the present invention, each of the magenta ink and the yellow ink preferably further contains a polymer dispersant as a pigment dispersant. Hereinafter, the polymer dispersant which can be suitably used in the present invention will be described.

The yellow ink and the magenta ink constituting the ink set of the present invention preferably contain dispersants having the same chemical structure, and particularly preferably contain the same dispersant. As a result of conducting thorough investigation, the inventor of the present invention found that by using dispersants having the same chemical structure in both of the inks, the characteristics of liquid droplets of the yellow ink and the magenta ink become alike, the liquid droplets uniformly spread or are uniformly mixed on a recording medium, and the color reproducibility (color reproduction range) is further improved. In order to obtain a wider color reproduction range, the glass transition temperature of the dispersant is preferably equal to or lower than 25° C., and the melting point of the dispersant is particularly preferably equal to or lower than 25° C. The effects of the glass transition temperature/melting point of the dispersant on the color reproducibility is assumed to be as below. In order to obtain a wider color reproduction range, it is preferable that the jetted ink droplets spread as wide as possible on a film of the ink that has been jetted/cured. On the surface layer of the film of the jetted/cured ink, a high-concentration dispersant is concentrated (based on cutting TOFSIMS (time-of-flight secondary ion mass spectroscopy)), and in a case where the dispersant has fluidity (glass transition temperature of equal to or lower than 25° C.) at room temperature (around 25° C.), the ink droplets are assumed to spread more widely.

The glass transition temperature (Tg) or the melting point can be determined from the primary maximum peak measured using a differential scanning calorimeter (manufactured by PerkinElmer Inc.: DSC-7) based on ASTMD 3418-8. For correcting the temperature of the detection portion of the device (DSC-7), melting points of indium and zinc are used, and for correcting calories, the heat of melting of indium is used. For a sample, an aluminum pan is used, and as control, an empty pan is set. The temperature is increased at a rate of 10° C./min and then held at 150° C. for 5 minutes. Thereafter, by using liquid nitrogen, the temperature is decreased to 0° C. from 150° C. at −10° C./min and then held at 0° C. for 5 minutes. Then the temperature is increased again to 150° C. from 0° C. at 10° C./min. From the obtained endothermic curve at the time of the second session of increasing the temperature, an onset temperature is analyzed. Based on the onset temperature, the glass transition temperature or the melting point is determined. Herein, the measurement temperature may be changed according to the intended measurement range.

From the viewpoint of improving the storage stability of both of the PY 185 ink and the PR 57:1 ink, the dispersant preferably has an amine value of 35 mgKOH/g to 45 mgKOH/g. Herein, the amine value is measured according to the following procedure. The dispersant is dissolved in methyl isobutyl ketone and subjected to potentiometric titration by using a 0.01 mol/L perchloric acid methyl isobutyl ketone solution, and the obtained value expressed using mgKOH/g is taken as an amine value. The potentiometric titration is performed using an automatic titrator COM-1500 manufactured by HIRANUMA SANGYO Co., LTD.

From the viewpoint of improving the storage stability and excellent dispersibility, the polymer dispersant is preferably a copolymer having a monomer unit represented by the following Formula (1).

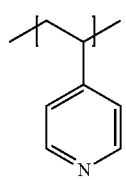

(1)

Furthermore, from the viewpoint of improving the storage stability and excellent dispersibility, the polymer dispersant is more preferably a copolymer having a monomer unit represented by the following Formula (1), a monomer unit represented by the following Formula (2), and a monomer unit represented by the following Formula (3).

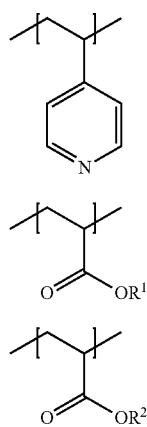

In the formulae, $R^1$ represents an alkyl group having 2 to 15 carbon atoms, and $R^2$ represented by a polyalkylene oxide group having 10 to 50 carbon atoms that has a hydroxy group or an alkoxy group on a terminal.

The alkyl group represented by $R^1$ may have a branch or a cyclic structure.

$R^1$ is preferably an alkyl group having 2 to 8 carbon atoms, more preferably an alkyl group having 4 to 8 carbon atoms, and even more preferably a n-butyl group.

The polyalkylene oxide group represented by $R^2$ is preferably a polyethylene oxide group or a polypropylene oxide group.

$R^2$ is preferably a polyalkylene oxide group having 10 to 50 carbon atoms that has an alkoxy group on a terminal, and more preferably a polyethylene oxide group having 10 to 50 carbon atoms that has an alkoxy group on a terminal.

The method for synthesizing the copolymer having the monomer unit represented by Formula (1), the monomer unit represented by Formula (2), and the monomer unit represented by Formula (3) is not particularly limited. However, the copolymer can be more suitably synthesized by living radical polymerization using a nitroxide initiator (NMP initiator).

In a case where the polymer dispersant is a copolymer having the monomer unit represented by the Formula (1), particularly, in a case where the polymer dispersant is a copolymer having the monomer unit represented by the Formula (1), the monomer unit represented by the Formula (2), and the monomer unit represented by the Formula (3), provided that the total amount of the monomer units constituting the polymer dispersant is 100 mol %, the content of the monomer unit represented by Formula (1) in the polymer dispersant is preferably 5 mol % to 50 mol %, and particularly preferably 10 mol % to 30 mol %. Within the above range, the storage stability of the ink and the dispersibility of the pigment are further improved.

In the polymer dispersant, a molar ratio between the content of the monomer unit represented by Formula (2) and the content of the monomer unit represented by Formula (3) is preferably 2:1 to 1:2, and more preferably 1.5:1 to 1:1.5.

The polymer dispersant is preferably a block copolymer and particularly preferably a block copolymer which is composed of a block consisting of the monomer unit represented by Formula (1) and a block in which the monomer unit represented by Formula (2) and the monomer unit represented by Formula (3) are randomly bonded to each other. If the above aspect is adopted, the storage stability of the ink and the dispersibility of the pigment are further improved.

The weight-average molecular weight (Mw) of the polymer dispersant is preferably 10,000 to 70,000, more preferably 12,000 to 30,000, even more preferably 13,000 to 25,000, and particularly preferably 15,000 to 20,000.

The weight-average molecular weight is measured by gel permeation chromatography (GPC). GPC is performed using HLC-8020 GPC (manufactured by TOSOH CORPORATION), TSKgel Super HZM-H, TSKgel Super HZ4000, and TSKgel Super HZ200 (manufactured by TOSOH CORPORATION, 4.6 mmID×15 cm) as columns, and tetrahydrofuran (THF) as an eluent, and by setting the temperature of a column oven to be 40° C. For the calculation of the weight-average molecular weight, polystyrene is used as a standard substance.

As the polymer dispersant described above, commercial polymer dispersant products manufactured by, for example, Ajinomoto Fine-Techno Co., Inc., Evonik Industries (TEGODISPERS series), BYK Chemie GmbH (DISPERBYK series and BYK series), BASF Corporation (EFKA series), The Lubrizol Corporation (Solsperse series), and the like are available. Examples of commercially available products which can be used as the polymer dispersant for the magenta ink and the yellow ink preferably include EFKA 7701 (amine value of 40.0 mgKOH/g) supplied from BASF Corporation.

The ink may contain, as a pigment dispersant, a known low-molecular weight type dispersant.

Examples of the low-molecular weight type pigment dispersant which can be concurrent used in the present invention include activators such as a higher fatty acid salt, alkyl sulfate, an alkyl ester sulfate, alkyl sulfonate, sulfosuccinate, naphthalene sulfonate, alkyl phosphate, a polyoxyalkylene alkyl ether phosphate, polyoxyalkylene alkylphenyl ether, polyoxyethylene polyoxypropylene glycol, glycerin ester, sorbitan ester, polyoxyethylene fatty acid amide, and amine oxide and salts of these.

The method for dispersing the pigment in the ink is not particularly limited, and various methods known to those in the related art can be adopted. As one of the methods, the pigment can be preliminarily dispersed with a mixer and then finally dispersed by so-called medium dispersion (ball mill, sand mill, beads mill, circulation type beads mill, and the like) until fine pigment particles are obtained. Particularly, a beads mill dispersion apparatus is preferable because it is excellent in dispersibility.

At the time of performing beads mill dispersion, by using beads whose volume average diameter is preferably 0.01 mm to 3.0 mm, more preferably 0.05 mm to 1.5 mm, and even more preferably 0.1 mm to 1.0 mm, a pigment dispersion having excellent stability can be obtained.

Furthermore, for the purpose of removing coarse particles of the pigment dispersion after dispersing the pigment, it is preferable to use a filter.

Provided that the content of the C. I. Pigment Red 57:1 or the C. I. Pigment Yellow 185 is denoted as Mp, and the content of the polymer dispersant is denoted as Md, a mass ratio of Md/Mp in each of the magenta ink and the yellow ink is preferably 0.1 to 0.8, more preferably 0.2 to 0.7, and even more preferably 0.2 to 0.5. Within the above range, the dispersibility and the storage stability are further improved.

(Ethylenically Unsaturated Compound)

Both of the yellow ink and the magenta ink contained in the ink set of the present invention have radiation curing properties. In order to exhibit the radiation curing properties, both of the inks contain a radiation-curable compound. Even in a case where both of the inks are used concurrently with a cyan ink and/or a black ink, it is preferable that these inks also have radiation curing properties.

It is preferable that both of the yellow ink and the magenta ink contain a polymerizable compound as a radiation-curable compound.

Examples of the polymerizable compound include cationically polymerizable cyclic ethers (an epoxy compound, an oxetane compound, and the like) and a radically polymerizable and/or cationically polymerizable ethylenically unsaturated compound. Among these, an ethylenically unsaturated compound is preferable. Furthermore, as the polymerizable compound, a radically polymerizable compound is preferable.

Examples of the ethylenically unsaturated compound preferably include a polyfunctional ethylenically unsaturated compound having one or more vinyl ether groups, and more preferably include a polyfunctional ethylenically unsaturated compound having two or more vinyl ether groups. If the above aspect is adopted, the curing properties and the storage stability are further improved.

It is preferable that both of the magenta ink and the yellow ink further contain a polyfunctional ethylenically unsaturated compound having one or more vinyl ether groups.

Examples of the polyfunctional ethylenically unsaturated compound having one or more vinyl ether groups preferably include a polyfunctional vinyl ether compound, and a compound having one or more vinyl ether groups and one or more (meth)acryloxy groups.

Specifically, examples of the polyfunctional ethylenically unsaturated compound having one or more vinyl ether groups preferably include ethyl 2-(2-vinyloxyethoxy) acrylate, ethyl 2-(2-vinyloxyethoxy) methacrylate, ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Among these, ethyl 2-(2-vinyloxyethoxy) acrylate, ethyl 2-(2-vinyloxyethoxy) methacrylate, and triethylene glycol divinyl ether are more preferable, and triethylene glycol divinyl ether is particularly preferable. If the above aspect is adopted, the storage stability is further improved.

From the viewpoint of jettability, examples of the ethylenically unsaturated compound preferably include a compound having one or more vinyl ether groups and one or more (meth)acryloxy groups, and more preferably include ethyl 2-(2-vinyloxyethoxy) acrylate and ethyl 2-(2-vinyloxyethoxy) methacrylate.

In each ink, the content of the polyfunctional ethylenically unsaturated compound having one or more vinyl ether groups is preferably 1% by mass to 40% by mass, more preferably 5% by mass to 30% by mass, even more preferably 10% by mass to 20% by mass, and particularly preferably 12% by mass to 18% by mass, with respect to the total mass of the ink. Within the above range, the curing properties and the storage stability are further improved.

It is preferable that both of the magenta ink and the yellow ink contained in the ink set of the present invention contain 3-methyl-1,5-pentanediol diacrylate. The amount of 3-methyl-1,5-pentanediol diacrylate contained in each of the inks is more preferably equal to or greater than 50% by mass, even more preferably 50% by mass to 75% by mass, particularly preferably 55% by mass to 75% by mass, and most preferably 66.0% by mass to 71.0% by mass, with respect to the total mass of the ink. If the above aspect is adopted, the storage stability is further improved, and the bleeding out of the components in the cured ink to the outside can be inhibited.

It is preferable that both of the magenta ink and the yellow ink contained in the ink set of the present invention contain a polyfunctional (meth)acrylate compound other than 3-methyl-1,5-pentanediol diacrylate. The magenta ink and the yellow ink more preferably contain a (meth)acrylate compound having 3 or more functional groups, even more preferably contain a (meth)acrylate compound having 3 to 6 functional groups, and particularly preferably contain a trifunctional (meth)acrylate compound. If the above aspect is adopted, the curing properties are further improved, and the bleeding out of the components in the cured ink to the outside can be inhibited.

Examples of the divalent (meth)acrylate compound other than 3-methyl-1,5-pentanediol diacrylate include 3-methyl-1,5-pentanediol dimethacrylate, 1,6-hexanediol di(meth)acrylate, 1,10-decanediol di(meth)acrylate, neopentyl glycol di(meth)acrylate, 2,4-dimethyl-1,5-pentanediol di(meth)acrylate, butyl ethyl propanediol (meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butyl butandediol di(meth)acrylate, hydroxypivalic acid neopentyl glycol di(meth)acrylate, EO-modified bisphenol A di(meth)acrylate, bisphenol F polyethoxydi(meth)acrylate, polypropylene glycol di(meth)acrylate, oligopropylene glycol di(meth)acrylate, 1,4-butanediol di(meth)acrylate, 2-ethyl-2-butyl propanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, tripropylene glycol di(meth)acrylate, PO-modified neopentyl glycol di(meth)acrylate, and the like.

Examples of the trifunctional (meth)acrylate compound include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivaldehyde-modified dimethylolpropane tri(meth)acrylate, sorbitol tri(meth)acrylate, propoxylated trimethylolpropane tri(meth)acrylate, ethoxylated glycerin triacrylate, and the like.

Examples of the tetrafunctional (meth)acrylate compound include pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate, and the like.

Examples of the pentafunctional (meth)acrylate compound include sorbitol penta(meth)acrylate and dipentaerythritol penta(meth)acrylate.

Examples of the hexafunctional (meth)acrylate compound include dipentaerythritol hexa(meth)acrylate, sorbitol hexa(meth)acrylate, alkylene oxide-modified hexa(meth)acrylate of phosphagen, ε-caprolactone-modified dipentaerythritol hexa(meth)acrylate, and the like.

Among these, trimethylolpropane tri(meth)acrylate is particularly preferable.

The content of the polyfunctional (meth)acrylate compound other than 3-methyl-1,5-pentanediol diacrylate in each ink is preferably 0.1% by mass to 30% by mass, more preferably 0.5% by mass to 20% by mass, and even more preferably 1% by mass to 10% by mass, with respect to the total mass of the ink. Within the above range, the curing properties are further improved, and the bleeding out of the components in the cured ink to the outside can be inhibited.

In both of the magenta ink and the yellow ink contained in the ink set of the present invention, the amount of the polyfunctional ethylenically unsaturated compound is preferably equal to or greater than 90% by mass, more preferably equal to or greater than 95% by mass, even more preferably equal to or greater than 99% by mass, and particularly preferably 100% by mass, with respect to the total mass of the ethylenically unsaturated compound contained in the inks. Within the above range, the curing properties are further improved, and the bleeding out of the components in the cured ink to the outside can be inhibited.

Both of the magenta ink and the yellow ink contained in the ink set of the present invention may contain a monofunctional ethylenically unsaturated compound as an ethylenically unsaturated compound. The content of the monofunctional ethylenically unsaturated compound is preferably less than 10% by mass, and more preferably 0% by mass, with respect to the total mass of the ethylenically unsaturated compounds contained.

Examples of the monofunctional ethylenically unsaturated compound include phenoxyethyl (meth)acrylate, octyl (meth)acrylate, decyl (meth)acrylate, isodecyl (meth)acrylate, cyclic trimethylolpropane formal (meth)acrylate, 2-(2-ethoxyethoxy)ethyl (meth)acrylate, norbornyl (meth)acrylate, isobornyl (meth)acrylate, isophoryl (meth)acrylate, 3,3,5-trimethylcyclohexyl (meth)acrylate, 2-ethylhexyl (meth)acrylate, 2-hydroxyethyl (meth)acrylate, butoxyethyl (meth)acrylate, carbitol (meth)acrylate, cyclohexyl (meth)acrylate, tetrahydrofurfuryl (meth)acrylate, benzyl (meth)acrylate, methyl (meth)acrylate, n-butyl (meth)acrylate, decyl (meth)acrylate, lauryl (meth)acrylate, allyl (meth)acrylate, glycidyl (meth)acrylate, and dimethylaminomethyl (meth)acrylate.

Herein, each color ink used in the ink set of the present invention is preferably a solventless ink not containing a volatile solvent.

In the present invention, in a case where either or both of "acrylate" and "methacrylate" are mentioned, a description of "(meth)acrylate" is used, and in a case where either or both of "acryloxy" and "methacryloxy" are mentioned, a description of "(meth)acryloxy" is used.

In the ink usable in the present invention, as a polymerizable compound, it is possible to use commercially available products described in "Handbook of Cross-linking agent" edited by Shinzo Yamashita (1981, TAISEISHA LTD.); "Handbook of UV/EB Curing (Raw Materials)" edited by Kiyomi Kato (1985, Kobunshi Kankokai); "Application and Market of UV/EB curing techniques" edited by RadTech Japan, p. 79 (1989, CMC Publishing CO., LTD.); "Handbook of polyester resin" edited by Eichiro Takiyama (1988, NIKKAN KOGYO SHIMBUN, LTD.); and the like. Alternatively, it is possible to use radically polymerizable or crosslinkable monomers, oligomers, and polymers known in the related art.

The molecular weight of the ethylenically unsaturated compound is preferably 80 to 2,000, more preferably 80 to 1,000, and even more preferably 80 to 800.

The ink usable in the present invention can contain an oligomer having an ethylenically unsaturated group. As the ethylenically unsaturated group, a radically polymerizable ethylenically unsaturated group is preferable, and a (meth)acryloxy group is more preferable.

Examples of the oligomer having an ethylenically unsaturated group include an olefin-based oligomer (an ethylene oligomer, a propylene oligomer, a butene oligomer, or the like), a vinyl-based oligomer (a styrene oligomer, a vinyl alcohol oligomer, a vinyl pyrrolidone oligomer, an acrylate oligomer, a methacrylate oligomer, or the like), a diene-based oligomer (a butadiene oligomer, chloroprene rubber, a pentadiene oligomer, or the like), a ring-opening polymerizable oligomer (di-, tri-, or tetraethylene glycol, polyethylene glycol, polyethyleneimine, or the like), a polyaddition oligomer (oligoester acrylate, a polyamide oligomer, or a polyisocyanate oligomer), an addition condensation oligomer (a phenol resin, an amino resin, a xylene resin, a ketone resin, or the like), and the like having a radically polymerizable group. Among these, oligoester (meth)acrylate is preferable. Particularly, urethane (meth)acrylate, polyester (meth)acrylate, and epoxy (meth)acrylate are more preferable, and urethane (meth)acrylate is even more preferable.

Examples of the urethane (meth)acrylate preferably include aliphatic urethane (meth)acrylate and aromatic urethane (meth)acrylate, and more preferably include aliphatic urethane (meth)acrylate.

Furthermore, the urethane (meth)acrylate is preferably urethane (meth)acrylate having 4 or less functional groups, and more preferably urethane (meth)acrylate having 2 or less functional groups.

If the ink contains the urethane (meth)acrylate, an ink composition which exhibits excellent adhesiveness with respect to a substrate and has excellent curing properties is obtained.

Regarding the oligomer, "Oligomer Handbook" (supervised by Junji Furukawa, The Chemical Daily Co., Ltd.) can also be referred to.

One kind of the oligomer having an ethylenically unsaturated group may be used singly, or two or more kinds thereof may be used concurrently.

In the ink, the content of the oligomer having an ethylenically unsaturated group is preferably 0.1% by mass to 50% by mass, more preferably 0.5% by mass to 20% by mass, and even more preferably 1% by mass to 10% by mass, with respect to the total mass of the ink.

From the viewpoint of the curing properties and the adhesiveness, the content of the ethylenically unsaturated compound in the entirety of the ink usable in the present invention is preferably 50% by mass to 95% by mass, more preferably 60% by mass to 90% by mass, and even more preferably 70% by mass to 90% by mass, with respect to the total mass of the ink.

(Polymerization Initiator)

The ink contained in the ink set of the present invention preferably contains a polymerization initiator.

As the polymerization initiator usable in the present invention, known polymerization initiators can be used.

As the polymerization initiator usable in the present invention, one kind of polymerization initiator may be used singly, or two or more kinds thereof may be used concurrently. Furthermore, a cationic polymerization initiator and a radical polymerization initiator may be used concurrently. However, it is preferable that the ink contains at least a radical polymerization initiator.

The polymerization initiator usable in the present invention is a compound which generates a polymerization initiation species by absorbing external energy. The external energy used for the initiation of polymerization is roughly classified into heat and radiation (active radiation), and therefore, a thermal polymerization initiator and a photopolymerization initiator are respectively used.

<Radical Polymerization Initiator>

The radical polymerization initiator usable in the present invention is not particularly limited, and known radical polymerization initiators can be used.

Examples of the radical polymerization initiator usable in the present invention include (a) an aromatic ketones, (b) an acylphosphine compound, (c) an aromatic onium salt compound, (d) organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, (m) an alkylamine compound, and the like. As the radical polymerization initiator, the compounds (a) to (m) may be used singly or used in combination.

Among these, (a) aromatic ketons and (b) acyl phosphine compound are preferably used.

Preferred examples of (a) aromatic ketons, (b) an acylphosphine compound, and (e) a thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77-117, and the like. More preferred examples thereof include an α-thiobenzophenone compound described in JP1972-6416B (JP-S47-6416B), a benzoin ether compound described in JP1972-3981B (JP-S47-3981B), an α-substituted benzoin compound described in JP1972-22326B (JP-S47-22326B), a benzoin derivative described in JP1972-23664B (JP-S47-23664B), an aryolphosphonic acid ester described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H01-34242B), U.S. Pat. No. 4,318,791A, and EP0284561B, p-di(dimethylaminobenzene described in JP1990-211452A (JP-H02-211452A), thio-substituted aromatic ketone described in JP1986-194062A (JP-S61-194062A), acylphosphine sulfide described in JP1990-9597B (JP-H02-9597B), acylphosphine described in JP1990-9596B (JP-H02-9596B), thioxanthones described in JP1988-61950B (JP-S63-61950B), coumarins described in JP1984-42864B (JP-S59-42864B), and the like.

The ink contained in the ink set of the present invention preferably contains, as a radical polymerization initiator, an acylphosphine oxide compound, and more preferably contains an acylphosphine oxide compound and a thioxanthone compound. If the above aspect is adopted, the curing properties are further improved, and the bleeding out of the components in the cured ink to the outside can be inhibited.

Examples of the acylphosphine oxide compound suitably include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, bis(2,6-dimethoxybenzoyl)-2,4,4-trimethylpentylphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,4,6-trimethylbenzoyldiphenylphosphine oxide (LUCIRIN TPO, manufactured by BASF Corporation), 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Among these, as the acylphosphine oxide compound, bis(2,4,6-trimethylbenzoyl)phenylphosphine oxide (IRGACURE 819, manufactured by BASF Corporation) and bis(2,6-dimethoxybenzoyl)-2,4,4-trimethylpentylphenylphosphine oxide are preferable, and bis(2,4,6-trimethylbenzoyl)phenylphosphine oxide is particularly preferable.

It is preferable that the ink usable in the present invention contains, as a polymerization initiator, a compound functioning as a sensitizer (hereinafter, simply referred to as a "sensitizer" as well) so as to accelerate the decomposition of the polymerization initiator by absorbing specific active energy rays.

Examples of the sensitizer include polynuclear aromatic compounds (for example, pyrene, perylene, triphenylene, and 2-ethyl-9,10-dimethoxyanthracene), xanthenes (for example, fluorescein, eosin, erythrocin, rhodamine B, and rose Bengal), cyanines (for example, thiacarbocyanine and oxacarbocyanine), merocyanines (for example, merocyanine and carbomerocyanine), thiazines (for example, thionine, methylene blue, and toluidine blue), acridines (for example, acridine orange, chloroflavin, and acriflavin), anthraquinones (for example, anthraquinone), squaryliums (for example, squarylium), coumarins (for example, 7-diethylamino-4-methyl coumarin), thioxanthones (for example, isopropylthioxanthone), thiochromanones (for example, thiochromanone), and the like.

Among these, as the sensitizer, thioxanthones are preferable, and isopropylthioxanthone is more preferable.

Furthermore, one kind of the sensitizer may be used singly, or two or more kinds thereof may be used concurrently.

The ink usable in the present invention preferably contains, as a polymerization initiator, at least a compound represented by the following Formula (1) or (2), and more preferably contains at least a compound represented by the following Formula (1). If the above aspect is adopted, curing properties are further improved, and the bleeding out of the components in the cured ink to the outside can be inhibited.

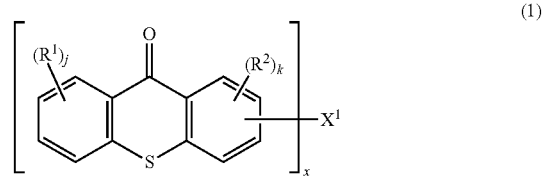

(1)

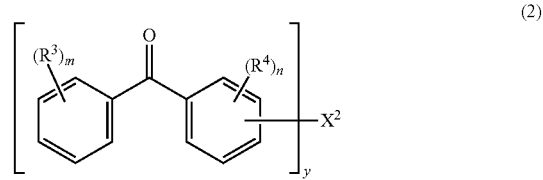

(2)

(In Formulae (1) and (2), each of $R^1$, $R^2$, $R^3$, and $R^4$ independently represents either an alkyl group having 1 to 5 carbon atoms or a halogen atom; each of x and y independently represents an integer of 2 to 4; each of j and m independently represents an integer of 0 to 4; each of k and n independently represents an integer of 0 to 3; when each of j, k, m, and n is an integer of equal to or greater than 2, a plurality of $R^1$'s, $R^2$'s, $R^3$'s, and $R^4$'s may be the same as or different from each other; $X^1$ represents an x-valent linking group containing at least one of a hydrocarbon chain, an ether bond, or an ester bond; and $X^2$ represents a y-valent linking group containing at least one of a hydrocarbon chain, an ether bond, or an ester bond).

From the viewpoint of inhibiting the elution of the compound from the cured film, odor, and blocking, the ink composition preferably does not contain a polymerization initiator having a molecular weight of less than 340 or contains the polymerization initiator in an amount of greater than 0% by mass and equal to or less than 1.0% by mass with respect to the total amount of the ink composition, more preferably does not contain the polymerization initiator or contains it in an amount of greater than 0% by mass and equal to or less than 0.5% by mass with respect to the total amount of the ink composition, even more preferably does not contain the polymerization initiator or contains it in an amount of greater than 0% by mass and equal to or less than 0.3% by mass, and particularly preferably does not contain the polymerization initiator.

—Compound Represented by Formula (1)—

The ink composition preferably contains a compound represented by Formula (1) as a polymerization initiator.

In Formula (1), each of $R^1$ and $R^2$ independently represents either an alkyl group having 1 to 5 carbon atoms or a halogen atom. The alkyl group having 1 to 5 carbon atoms may be linear, branched, or cyclic, but the alkyl group is preferably linear or branched. The alkyl group is preferably an alkyl group having 1 to 4 carbon atoms, more preferably an alkyl group having 2 or 3 carbon atoms, and even more preferably an ethyl group or an isopropyl group.

Examples of the halogen atom include a fluorine atom, a chlorine atom, a bromine atom, and an iodine atom, but the halogen atom is preferably a chlorine atom.

It is particularly preferable that each of $R^1$ and $R^2$ is independently an ethyl group, an isopropyl group, or a chlorine atom.

In Formula (1), j represents an integer of 0 to 4. j is preferably 0 to 2, and more preferably 0 or 1. In a case where j is an integer of equal to or greater than 2, a plurality of $R^1$'s may be the same as or different from each other.

In Formula (1), k represents an integer of 0 to 3. k is preferably 0 to 2, more preferably 0 or 1, and even more preferably 0. In a case where k is an integer of equal to or greater than 2, a plurality of $R^2$'s may be the same as or different from each other.

In Formula (1), x represents an integer of 2 to 4. x is preferably 3 or 4, and more preferably 4.

In Formula (1), $X^1$ represents an x-valent linking group consisting of an x-valent hydrocarbon chain having 2 to 300 carbon atoms that may contain an ether bond (—O—) and/or an ester bond (—(C=O)—O—).

In Formula (1), there is a plurality (x) of thioxanthone structures (each shown in the square bracket in Formula (1)) excluding $X^1$ which is a linking group. The structures may be the same as or different from each other and are not particularly limited. From the viewpoint of synthesis, they are preferably the same as each other.

As the compound represented by Formula (1), commercially available compounds can be used. Specific examples thereof include SPEEDCURE 7010 (1,3-di({α-[1-chloro-9-oxo-9H-thioxanthen-4-yl]oxy}acetylpoly[oxy(1-methylethylene)])oxy-2,2-bis({α-[1-chloro-9-oxo-9H-thioxanthen-4-yl]oxy}acetylpoly[oxy(1-methylethylene)]oxymethyl) propane, CAS No. 1003567-83-6) and OMNIPOL TX (Polybutyleneglycol bis(9-oxo-9H-thioxanthenyloxy)acetate, CAS No. 813452-37-8).

—Compound Represented by Formula (2)—

The ink preferably contains a compound represented by Formula (2) as a polymerization initiator.

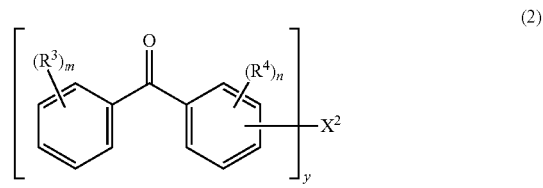

(In Formula (2), each of $R^3$ and $R^4$ independently represents either an alkyl group having 1 to 5 carbon atoms or a halogen atom; m represents an integer of 0 to 4; n represents an integer of 0 to 3; y represents an integer of 2 to 4; when each of m and n is an integer of equal to or greater than 2, a plurality of $R^3$'s and $R^4$'s may be the same as or different from each other, and $X^2$ represents a y-valent linking group containing at least one of a hydrocarbon chain, an ether bond, or an ester bond.)

In Formula (2), each of $R^3$ and $R^4$ independently represents either an alkyl group having 1 to 5 carbon atoms or a halogen atom. The alkyl group having 1 to 5 carbon atoms may be linear, branched, or cyclic, but the alkyl group is preferably linear or branched. The alkyl group is preferably an alkyl group having 1 to 4 carbon atoms, more preferably an alkyl group having 2 or 3 carbon atoms, and even more preferably an ethyl group or an isopropyl group. Examples of the halogen atom include a fluorine atom, a chlorine atom, a bromine atom, and an iodine atom, but the halogen atom is preferably a chlorine atom. Each of $R^3$ and $R^4$ is particularly preferably an ethyl group, an isopropyl group, or a chlorine atom.

In Formula (2), m represents an integer of 0 to 4. m is preferably 0 to 2, and more preferably 0 or 1. In a case where m is an integer of equal to or greater than 2, a plurality of $R^3$'s may be the same as or different from each other.

In Formula (2), n represents an integer of 0 to 3. n is preferably 0 to 2, more preferably 0 or 1, and even more preferably 0. In a case where n is an integer of equal to or greater than 2, a plurality of $R^4$'s may be the same as or different from each other.

In Formula (2), y represents an integer of 2 to 4. y is preferably 2 or 3, and more preferably 2.

In Formula (2), $X^2$ represents a y-valent linking group containing at least the one selected from the group consisting of a hydrocarbon chain, an ether bond (—O—), and an ester bond (—(C=O)—O—).

In Formula (2), there is a plurality (x) of benzophenone structures (each shown in the square bracket in Formula (2)) excluding $X^2$ which is a linking group. The structures may be the same as or different from each other and are not particularly limited. From the viewpoint of synthesis, they are preferably the same as each other.

As the compound represented by Formula (2), commercially available compounds can be used. Specific examples thereof include OMNIPOL BP (Polybutyleneglycol bis(4-benzoylphenoxy)acetate, CAS No. 515136-48-8).

The content of the compound represented by Formula (1) or (2) is preferably 0.01% by mass to 10% by mass, more preferably 0.05% by mass to 8.0% by mass, even more preferably 0.1% by mass to 5.0% by mass, and particularly preferably 0.1% by mass to 2.4% by mass, with respect to the total amount of the ink. Within the above range, the curing properties are further improved.

One kind of the polymerization initiator may be used singly, or two or more kinds thereof may be used concurrently.

The total content of the polymerization initiator is preferably 1.0% by mass to 15.0% by mass, more preferably 1.5% by mass to 10.0% by mass, and even more preferably 1.5% by mass to 7.0% by mass, with respect to the total amount of the ink. Within the above range, the curing properties are improved.

(Surfactant)

A surfactant may be added to the ink usable in the present invention so as to impart jetting properties stable for a long period of time.

As the surfactant, those described in publications such as JP1987-173463A (JP-S62-173463A) and JP1987-183457A (JP-S62-183457A) can be exemplified. Examples of the surfactant include anionic surfactants such as dialkyl sulfosuccinates, alkyl naphthalene sulfonates, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkyl amine salts and quaternary ammonium salts. Furthermore, as the surfactant, a fluorine-based surfactant (for example, an organic fluoro compound) or a silicone-based surfactant (for example, a polysiloxane compound) may be used. The organic fluoro compound is preferably hydrophobic. The organic fluoro compound include, for example, a fluorine-based surfactant, an oil-like fluorine-based compound (for example, fluorine oil), and a solid-like fluorine compound resin (for example, a tetrafluoroethylene resin), and examples thereof include those described in the publications such as JP1982-9053B (JP-S57-9053B) (the $8^{th}$ to $17^{th}$ columns) and JP1987-135826A (JP-S62-135826A).

The polysiloxane compound described above is preferably a modified polysiloxane compound obtained by introducing an organic group into a portion of methyl groups of dimethylpolysiloxane. Examples of the modification method include polyether modification, methylstyrene modification, alcohol modification, alkyl modification, aralkyl modification, fatty acid ester modification, epoxy modification, amine modification, amino modification, mercapto modification, and the like, but the method is not limited to these. These modification methods may be used in combination. From the viewpoint of improving the jetting stability in an ink jet, among the above compounds, a polyether-modified polysiloxane compound is preferable.

Examples of the polyether-modified polysiloxane compound include SILWET L-7604, SILWET L-7607N, SILWET FZ-2104, and SILWET FZ-2161 (manufactured by Nippon Unicar Company Limited), BYK 306, BYK 307, BYK 331, BYK 333, BYK 347, BYK 348, and the like (manufactured by BYK Chemie GmbH), KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, as the surfactant, a silicone-based surfactant is preferable, a polysiloxane-based surfactant is more preferable, and a polydimethylsiloxane-based surfactant is even more preferable.

The content of the surfactant in the ink composition of the present invention is appropriately selected according to the purpose of use, but is preferably 0.0001% by mass to 3% by mass with respect to the total mass of the ink composition.

In the ink set of the present invention, each of the magenta ink and the yellow ink preferably contains a polysiloxane-based surfactant in an amount of equal to or greater than 0.01% by mass and equal to or less than 3% by mass. If the above surfactant is concurrently used, it is possible to regulate the surface tension of the ink, to impart appropriate wettability to small ink droplets jetted onto a substrate used for printing, and to cause the ink droplets of different colors to superimposed on each other.

In a case where the ink set of the present invention is used for printing for indoor use, particularly, in a case where a corrugated board is used as a substrate, the surface of the corrugated board has relatively poor smoothness (the surface has irregularities) and low surface tension. Therefore, in order to obtain a uniformly cured film, each of the magenta ink and the yellow ink further contains a polysiloxane-based surfactant preferably in an amount of equal to or greater than 0.01% by mass and equal to or less than 3% by mass, and more preferably in an amount of equal to or greater than 0.1% by mass and equal to or less than 2% by mass.

(Other Components)

If necessary, the yellow ink and/or the magenta ink contained in the ink set of the present invention may contain a co-sensitizer, an ultraviolet absorber, an antioxidant, an antifading agent, conductive salts, a solvent, a polymer compound, a basic compound, and the like in addition to the respective components described above. These components are described in, for example, JP2009-221416A, and can be used in the present invention as well.

From the viewpoint of the storage stability and the inhibition of head clogging, the ink in the ink set of the present invention preferably contains a polymerization inhibitor.

It is preferable that the polymerization inhibitor is added in an amount of 200 ppm to 20,000 ppm with respect to the total amount of the ink.

Examples of the polymerization inhibitor include a nitroso-based polymerization inhibitor, a hindered amine-based polymerization inhibitor, hydroquinone, benzoquinone, p-methoxyphenol, TEMPO, TEMPOL, cupferron AI, and the like.

(Ink Properties)

The viscosity or surface tension of the magenta ink and/or the yellow ink contained in the ink set of the present invention is preferably within a range suitable for jetting by an ink jet head mounted on a printer to be used. Assuming that the ink set is used in a piezoelectric ink jet head that is wide used in general, the viscosity of the ink is preferably 6 mPa·s to 30 mPa·s (25° C.), and particularly preferably 15 mPa·s to 25 mPa·s.

Furthermore, the viscosity at a jetting temperature (preferably 25° C. to 80° C. and more preferably 25° C. to 50° C.) is preferably 3 mPa·s to 15 mPa·s, and more preferably 3 mPa·s to 13 mPa·s. It is preferable to appropriately adjust the compositional ratio of the ink such that the viscosity thereof falls into the above range. By setting the viscosity at room temperature to be high, even in a case where a porous recording medium (support) is used, it is possible to avoid the permeation of the ink into the recording medium and to reduce the amount of the uncured monomer. In addition, it is preferable to set the viscosity at room temperature to be high, because then the bleeding of the ink at the time of landing of ink droplets is inhibited, and hence the image quality is improved.

The surface tension of the ink at 25° C. is preferably 20 mN/m to 40 mN/m, and particularly preferably 28 mN/m to 38 mN/m. In a case where recording is performed on various recording media such as a polyolefin, PET, coated paper, and uncoated paper, the surface tension is preferably equal to or greater than 20 mN/m from the viewpoint of bleeding and permeation and preferably equal to or less than 40 mN/m in view of wettability.

(Ink Jet Recording Method)

An ink jet recording method of the present invention includes (1) jetting the magenta ink and/or the yellow ink contained in the ink set of the present invention onto a substrate, which is a recording medium, from an ink jet recording head, and (2) curing the jetted magenta ink and/or the yellow ink by radiation irradiation.

For full color printing, the magenta ink and the yellow ink are preferably used concurrently with a cyan ink, more preferably used concurrently with cyan and black inks, and particularly preferably used concurrently with cyan, black, and white inks.

By including both of the steps (1) and (2), the ink jet recording method of the present invention forms a cured image of coloring inks including the magenta ink and the yellow ink on a recording medium (substrate).

Furthermore, by the ink jet recording method of the present invention, a printed material containing the cured magenta ink and yellow ink on a substrate is obtained.

In the (1) jetting step in the ink jet recording method of the present invention, an ink jet recording device, which will be specifically described below, can be used.

(Ink Jet Recording Device)

The ink jet recording device usable in the ink jet recording method of the present invention is not particularly limited, and any of known ink jet recording devices which can achieve the intended resolution can be selected and used. That is, with any of the known ink jet recording devices including commercially available products, the ink composition can be jetted onto a recording medium in the step of (1) jetting the ink jet recording method of the present invention.

Examples of the ink jet recording device usable in the present invention include a device including an ink supply system, a temperature sensor, and a source of active energy rays.

The ink supply system includes, for example, a main tank that contains the ink composition of the present invention, supply piping, an ink supply tank that is immediately before an ink jet head, a filter, and a piezoelectric ink jet head. The piezoelectric ink jet head can be driven such that multi-size dots can be jetted preferably in an amount of 1 pl to 100 pl, and more preferably in an amount of 8 pl to 30 pl, preferably at a resolution of 320×320 dpi to 4,000×4,000 dpi, more preferably at a resolution of 400×400 dpi to 1,600×1,600 dpi, and even more preferably at a resolution of 720×720 dpi. In the present invention, "dpi" refers to the number of dots per 2.54 cm.

It is preferable that the temperature of the ink composition of the magenta ink and the yellow ink (in the present invention, both of the inks are collectively referred to as an "ink" as well) to be jetted is kept constant. Therefore, it is preferable that the ink jet recording device comprises means for stabilizing the temperature of the ink composition. The site to be kept at a constant temperature includes a piping system from an ink tank (intermediate tank in a case where the device has an intermediate tank) to the jet surface of a nozzle and all members. That is, the area from the ink supply tank to the portion of the ink jet head can be insulated and heated.

The temperature control method is not particularly limited. However, for example, it is preferable to provide a plurality of temperature sensors in the respective piping portions so as to control heating according to the flow rate of the ink and the environmental temperature. The temperature sensor can be provided in the ink supply tank and in the vicinity of the nozzle of the ink jet head. Moreover, it is preferable that the head unit to be heated is a heat blocking unit or is thermally insulated, such that the body of the device is not influenced by the temperature of external air. In order to shorten printer startup time taken for heating or to reduce thermal energy loss, it is preferable to insulate the heating unit from other sites and to reduce a total thermal capacity of the heating unit.

The ink is jetted using the ink jet recording device described above, after the ink is heated preferably to 25° C. to 80° C. and more preferably to 25° C. to 50° C., and after the viscosity of the ink is reduced preferably to 3 mPa·s to 15 mPa·s and more preferably to 3 mPa·s to 13 mPa·s. Particularly, as the ink composition of the present invention, it is preferable to use an ink having a viscosity of equal to or less than 50 mPa·s at 25° C., because then the ink can be excellently jetted. If the above method is used, high jetting stability can be realized.

Usually, the viscosity of the radiation curable type ink jet ink is higher than the viscosity of an aqueous ink composition that is generally used for ink jet recording. Accordingly, the viscosity of the radiation curable type ink jet ink greatly varies with the temperature at the time of jetting. The variation in the viscosity of the ink exerts a great influence on the change of the liquid droplet size and on the change of the jetting rate of the liquid droplets, and results in the deterioration of image quality. Therefore, it is preferable that the temperature of the ink at the time of jetting is kept as constant as possible. Consequently, in the present invention, it is appropriate for the temperature of the ink to be controlled preferably within a range of a set temperature ±5° C., more preferably within a range of a set temperature ±2° C., and even more preferably within a range of a set temperature ±1° C.

Next, the step (curing step) of (2) curing the jetted magenta ink and/or the yellow ink (ink composition) by radiation (active radiation) irradiation will be described.

The ink composition jetted onto a recording medium is cured by being irradiated with radiation for the following reason. The polymerization initiator contained in the ink is decomposed by being irradiated with active energy rays and generates a polymerization species such as a radical, an acid, or the like, and due to the function of the initiation species, the polymerization reaction of the polymerizable compound is caused and accelerated. At this time, if the polymerization initiator and the sensitizer coexist in the ink, the sensitizer in the system absorbs the active energy rays and becomes in an excited state, the decomposition of the polymerization initiator is accelerated due to the interaction between the sensitizer and the polymerization initiator, and thus the curing reaction with higher sensitivity can be accomplished.

Herein, as the radiation to be used, α rays, γ rays, electron beam, X rays, ultraviolet rays, visible rays, infrared light, and the like can be used. The peak wavelength of the radiation is preferably 200 nm to 600 nm, more preferably 300 nm to 450 nm, even more preferably 320 nm to 420 nm, although the peak wavelength also depends on the absorption characteristics of the sensitizer. It is particularly preferable that the radiation is ultraviolet rays whose peak wavelength is within a range of 340 nm to 400 nm.

The polymerization initiating system of the ink exhibits sufficient sensitivity even when a low-power radiation is used. Therefore, it is appropriate that the ink is cured at an exposure surface illuminance of preferably 10 mW/cm$^2$ to 4,000 mW/cm$^2$ and more preferably 20 mW/cm$^2$ to 2,500 mW/cm$^2$.

As a radiation source (light source), a mercury lamp, a gas or solid laser, and the like are mainly used. Furthermore, as a light source used for curing an ultraviolet curable type ink composition for inkjet recording, a mercury lamp or a metal halide lamp is widely known. However, currently, from the viewpoint of environmental protection, it is strongly desired not to use a mercury lamp. Therefore, in view of industrial and environmental aspect, it is extremely useful to replace the mercury lamp with a GaN-based semiconductor ultraviolet light emitting device. In addition, LED (UV-LED) and LD (UV-LD) are expected to be used as a light source for a photocurable ink jet because these devices are compact, have long service life and high efficiency, and are low-cost.

Moreover, a light emitting diode (LED) and a laser diode (LD) can be used as a source of active energy rays. Particularly, in a case where an ultraviolet ray source is required, an ultraviolet LED and an ultraviolet LD can be used. For example, NICHIA CORPORATION put an ultraviolet LED, whose main emission spectrum has a wavelength between 365 nm to 420 nm, on the market. In a case where the shorter wavelength is required, the LED disclosed in U.S. Pat. No. 6,084,250A that can emit active energy rays centered on 300 nm and 370 nm can be used. Furthermore, other ultraviolet LEDs are available and can emit radiation of different ultraviolet bands. A UV-LED is the source of the active energy rays that is particularly preferred in the present invention. Particularly, a UV-LED having a peak wavelength at 340 nm to 400 nm is preferable.

The maximum illuminance of the LED on a recording medium is preferably 10 mW/cm$^2$ to 2,000 mw/cm$^2$, more preferably 20 mW/cm$^2$ to 1,000 mW/cm$^2$, and particularly preferably 50 mW/cm$^2$ to 800 mW/cm$^2$.

It is appropriate that the ink is irradiated with the aforementioned radiation preferably for 0.01 seconds to 120 seconds, and more preferably for 0.1 seconds to 90 seconds. The irradiation conditions of the radiation and the basic irradiation method are disclosed in JP1985-132767A (JP-S60-132767A). Specifically, a light source is disposed on both sides of a head unit including an ink jet device, and the head unit and the light source are scanned by a so-called shuttle method such that the ink is irradiated with radiation. The radiation irradiation is performed for a certain period of time (preferably for 0.01 seconds to 0.5 seconds, more preferably for 0.01 seconds to 0.3 seconds, and even more preferably for 0.01 seconds to 0.15 seconds) after the landing of the ink. If the time period from the landing of the ink to the irradiation is controlled within an extremely short period of time, it is possible to prevent the ink having landed on a recording medium from going through bleeding before being cured. Furthermore, it is preferable to shorten the aforementioned time period because, even if a porous recording medium used, the ink can be exposed to light before it permeates the recording medium into a deep portion that the light source does not reach, and therefore an unreacted monomer is prevented from remaining.

In addition, curing may be completed by using another light source that is not driven. Examples of the irradiation method include a method of using optical fiber and a method of irradiating a recording portion with reflected light by irradiating a mirror surface with collimated light (UV light). These curing methods can also be applied to the ink jet recording method of the present invention.

If the aforementioned ink jet recording method is adopted, even when various recording media, which differ from each other in terms of the wettability of the surface thereof, are used, a dot diameter of the ink composition having landed thereon can be kept constant, and thus the image quality is improved. Furthermore, in order to obtain a color image, it is preferable to superimpose ink compositions sequentially from an ink composition with color of high brightness. If ink compositions are superimposed on each other sequentially from an ink with high brightness, the irradiated radiation easily reaches the ink in the lower portion, and excellent curing sensitivity, reduction in the residual monomer, and improvement of the adhesiveness can be expected. During the irradiation, all of the color inks can be jetted and exposed to light at the same time. However, from the viewpoint of accelerating curing, it is preferable that an ink of a single color is separately exposed to light.

In this way, the ink is cured with high sensitivity by being irradiated with radiation and can form an image on the surface of a recording medium.

The ink set of the present invention is preferably used as an ink set to which cyan, black and white inks are added.

In the ink jet recording method of the present invention, the order of jetting the respective coloring ink compositions is not particularly limited. However, the ink compositions are preferably provided onto a recording medium from a coloring ink composition with high brightness. In a case where yellow, cyan, magenta, and black inks are used, it is preferable that the ink compositions are provided onto a recording medium in order of yellow, cyan, magenta, and black. Furthermore, in a case where a white ink is used in addition to these, it is preferable that the ink compositions are provided onto a recording medium in order of white, yellow, cyan, magenta, and black. The present invention is not limited to the above, and it is possible to use an ink set including at least ink compositions of seven colors in total such as yellow, light cyan, light magenta, cyan, magenta, black, and white. In this case, it is preferable that the ink compositions are provided onto a recording medium in order of white, light cyan, light magenta, yellow, cyan, magenta, and black.

In the present invention, the recording medium is not particularly limited, and a recording medium known as a support or a recording material can be used. Examples of the recording medium include a corrugated board, paper, paper on which plastic (for example, polyethylene, polypropylene, or polystyrene) is laminated, a metal plate (for example, aluminum, zinc, or copper), a plastic film (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetate), paper or a plastic film onto which the aforementioned metal is laminated or vapor-deposited, and the like. Furthermore, as the recording medium in the present invention, a recording medium used in a printed material for indoor use can be suitably used. As the recording medium, seals, labels, plastic containers, and corrugated boards can be more suitably used, and corrugated boards, seals, and labels can be even more suitably used.

The corrugated board refers to a processed board-like paper product which is obtained by toughening paperboards by establishing a multilayer structure and can be used as packaging material or the like. The corrugated board includes not only a corrugated board sheet as a material but also a reprocessed corrugated board box and other corrugated board products. The corrugated board may have craft color that is the color of the general base paper. However, a white corrugated board appearing white for which a white liner is used is preferable because printing is finished up cleanly on such a corrugated board. In a case of the corrugated board with craft color, if necessary, color printing may be performed after solid printing is performed using a white ink.

Examples

Hereinafter, the present invention will be specifically described based on examples, but the present invention is not limited to the examples.

In the following description, unless otherwise specified, "part" represents "part by mass", and "%" represents "% by mass".

<Preparation of Polymers 1 to 3 (Polymer Dispersants) Having Pyridine Skeleton>

—First Step: Synthesis of Polyacrylate—

Two kinds of MNP initiators and one kind of monomer at a ratio described in "Polymer 1" of Table 1 were put into a flask (nitrogen atmosphere, room temperature (15° C. to 30° C.)) and mixed together, thereby obtaining a uniform mixed solution. During mixing, deaeration and $N_2$ purge processing were performed about 2 to 4 times in the flask. Then, the mixed solution was heated in an oil bath heated to 100° C. to 130° C., thereby causing a polymerization reaction for about 5 to 15 hours. At a point in time when the concentration of solid contents became about 50% by volume, the mixed solution was cooled using liquid nitrogen, thereby stopping the reaction. Thereafter, the unreacted monomer was removed by vacuum distillation, thereby obtaining a polymer.

—Second Step: Synthesis of Polyacrylate-Poly(Vinylpyridine)—

One kind of MNP initiator at a ratio described in "Polymer 1" of Table 1, the polymer prepared in the first step, and 4-vinylpyridine were put into a flask (nitrogen atmosphere, room temperature) and mixed together, thereby obtaining a uniform mixed solution. During mixing, deaeration and $N_2$ purge processing were performed about 2 to 4 times in the flask. Then, the mixed solution was heated in an oil bath heated to 100° C. to 140° C., thereby causing a polymerization reaction for about 2 to 5 hours. At a point in time when the concentration of solid contents became about 90% by volume, the mixed solution was cooled using liquid nitrogen, thereby stopping the reaction. Thereafter, the unreacted monomer was removed by vacuum distillation, thereby obtaining a polymer.

—Third Step: Synthesis of Polymer Having Pyridine Skeleton—

The polymer at a ratio described in "Polymer 1" of Table 1 that was prepared in the second step and glycol ethers were put into a flask (nitrogen atmosphere, room temperature) and mixed together, thereby obtaining a uniform mixed solution. During mixing, deaeration and $N_2$ purge processing were performed about 2 to 4 times in the flask. Then, the mixed solution was heated in an oil bath heated to 100° C. to 140° C. Subsequently, an operation, in which a catalyst solution (a methanol solution with 10% lithium methanolate, 0.2 parts by mass) was added thereto every hour followed by distillation under reduced pressure, was repeated 5 times. The mixed solution was cooled using liquid nitrogen so as to stop the reaction, thereby obtaining a polymer 1.

Polymers 2 and 3 were prepared by the same method as the preparation method of the polymer 1, except that the ratios of the components used for preparing the polymer 1 were changed to the ratios of the polymers 2 and 3 as shown in Table 1.

Through gel permeation chromatography (GPC) and nuclear magnetic resonance (NMR) spectroscopy, it was confirmed that the polymer obtained in the third step has a molecular weight (weight-average molecular weight, Mw) and a polymerization degree shown in Table 1.

TABLE 1

|  | Polymer 1 | Polymer 2 | Polymer 3 |
| --- | --- | --- | --- |
| First step | | | |
| NMP initiator 1 | 12 parts by mass | 12 parts by mass | 12 parts by mass |
| NMP initiator 2 | 4 parts by mass | 4 parts by mass | 4 parts by mass |
| n-Butyl acrylate (nBA) | 84 parts by mass | 84 parts by mass | 84 parts by mass |
| Second step | | | |
| NMP initiator 2 | 2 parts by mass | 2 parts by mass | 2 parts by mass |
| Poly(nBA): polymer obtained in the first step | 66 parts by mass | 78 parts by mass | 38 parts by mass |
| 4-Vinylpyridine (4VP) | 32 parts by mass | 20 parts by mass | 60 parts by mass |
| Third step | | | |
| Poly(nBA-4VP): polymer obtained in the second step | 33 parts by mass | 33 parts by mass | 33 parts by mass |
| Poly(ethylene glyco)methyl ether: Mw = 550 g/mol | 66 parts by mass | 66 parts by mass | 66 parts by mass |
| Methanol solution with 10% lithium methanolate | 1 part by mass | 1 part by mass | 1 part by mass |
| Weight-average molecular weight: Mw | 17,000 | 16,500 | 17,500 |
| Polymerization degree (molar ratio) Acrylate:alkylene glycol:pyridine | 47:37:16 | 52:38:10 | 33:37:30 |

The details of the used materials described in Table 1 are as follows.

NMP initiator 1: N-tert-Butyl-N-(2-Methyl-1-phenylpropyl)-O-(1-phenylethyl)hydroxylamine (manufactured by Sigma-Aldrich Co, LLC., product number 700703)

NMP initiator 2: 2,2,5-Trimethyl-4-phenyl-3-azahexane-3-nitroxide (manufactured by Sigma-Aldrich Co, LLC., product number 710733)

n-Butyl acrylate (manufactured by Mitsubishi Chemical Corporation)

4-Vinylpyridine (manufactured by Tokyo Chemical Industry Co., Ltd., product number V0025)

Poly(ethylene glycol)methyl ether (Mw=550 g/mol, manufactured by Wako Pure Chemical Industries, Ltd., product code 041561)

Methanol solution with 10% lithium methanolate (manufactured by Sigma-Aldrich Co, LLC., product code 62562)

<Preparation of Yellow Pigment Dispersion>

Yellow pigment dispersions YM1 to YM6 shown in the following Table 2 were prepared by the following method. In the composition described in Table 2, 80 parts of components other than pigments were stirred with a mixer manufactured by SILVERSON (10 minutes to 15 minutes, 2,000 rpm to 3,000 rpm), thereby obtaining a uniform and transparent solution (dispersant diluent). Pigments were added to the transparent solution (dispersant diluent) and further stirred with the mixer (10 minutes to 20 minutes, 2,000 rpm to 3,000 rpm), thereby obtaining a uniform preliminary dispersion. Then, by using a circulation type beads mill apparatus (Laboratory Mini Mill) manufactured by EIGER TORRANCE LIMITED, dispersion processing was performed. The dispersion was performed using 100 parts of zirconia beads having a diameter of 0.65 mm, under the conditions of a circumferential speed of 15 m/s and a dispersion time of 60 minutes to 120 minutes.

TABLE 2

|  |  | YM1 | YM2 | YM3 | YM4 | YM5 | YM6 |
|---|---|---|---|---|---|---|---|
| Pigment | Paliotol Yellow D1155 (PY 185) | 20 | — | — | 20 | 20 | 20 |
|  | Cromophtal Yellow L 1061 HD (PY 151) | — | 20 | — | — | — | — |
|  | INKJET YELLOW H2G (PY 120) | — | — | 20 | — | — | — |
| Dispersant | Polymer 1 | 10 | 10 | 10 | — | — | — |
|  | Sol 32000 | — | — | — | 10 | — | — |
|  | Polymer 2 | — | — | — | — | 10 | — |
|  | Polymer 3 | — | — | — | — | — | 10 |
| Monomer | 3MPDDA | 69.9 | 69.9 | 69.9 | 69.9 | 69.9 | 69.9 |
| Inhibitor | UV 22 | 0.1 | 0.1 | 0.1 | 0.1 | 0.1 | 0.1 |

The unit of the numerical values described in Table 2 is part by mass.

The details of the components used for preparing the yellow pigment dispersants YM1 to YM6 are as follows. Furthermore, the same abbreviation as in the following description will be used below.

Paliotol Yellow D1155 (PY 185): yellow pigment C. I. Pigment Yellow 185 (manufactured by BASF Corporation)

Cromophtal Yellow L 1061 HD (PY 151): yellow pigment C. I. Pigment Yellow 151 (manufactured by BASF Corporation)

INKJET YELLOW H2G (PY 120): yellow pigment C. I. Pigment Yellow 120 (manufactured by Clariant)

Sol32000: polymer dispersant (Solsperse 32000, manufactured by The Lubrizol Corporation)

3MPDDA: 3-methyl-1,5-pentanediol diacrylate (SR341, manufactured by Sartomer)

UV 22: 4-benzylidene-2,6-di-tert-butyl-cyclohexane-2,5-dienone, trade name Irgastab UV 22, manufactured by BASF Corporation, Polymerization inhibitor <Preparation of Magenta Pigment Dispersant>

Magenta pigment dispersions MM1 to MM6 shown in the following Table 3 were prepared by the following method. In the composition described in Table 3, 80 parts of components other than pigments were stirred with a mixer manufactured by SILVERSON (10 minutes to 15 minutes, 2,000 rpm to 3,000 rpm), thereby obtaining a uniform and transparent solution (dispersant diluent). Pigments were added to the transparent solution (dispersant diluent) and further stirred with the mixer (10 minutes to 20 minutes, 2,000 rpm to 3,000 rpm), thereby obtaining a uniform preliminary dispersion. Then, by using a circulation type beads mill apparatus (Laboratory Mini Mill) manufactured by EIGER TORRANCE LIMITED, dispersion processing was performed. The dispersion was performed using 100 parts of zirconia beads having a diameter of 0.65 mm, under the conditions of a circumferential speed of 15 m/s and a dispersion time of 60 minutes to 120 minutes.

TABLE 3

|  |  | MM1 | MM2 | MM3 | MM4 | MM5 | MM6 |
|---|---|---|---|---|---|---|---|
| Pigment | Irgalite Rubine D 4240 (PR 57:1) | 20 | — | — | 20 | 20 | 20 |
|  | Irgalite Red L 3773 (PR 48:4) | — | 20 | — | — | — | — |
|  | Cinquasia Pink K 4430 FP (PR 122) | — | — | 20 | — | — | — |
| Dispersant | Polymer 1 | 10 | 10 | 10 | — | — | — |
|  | Sol 32000 | — | — | — | 10 | — | — |
|  | Polymer 2 | — | — | — | — | 10 | — |
|  | Polymer 3 | — | — | — | — | — | 10 |
| Monomer | 3MPDDA | 69.9 | 69.9 | 69.9 | 69.9 | 69.9 | 69.9 |
| Inhibitor | UV 22 | 0.1 | 0.1 | 0.1 | 0.1 | 0.1 | 0.1 |

The unit of the numerical values described in Table 3 is part by mass.

The details of the pigments used for preparing the magenta pigment dispersions MM1 to MM6 are as follows.

Irgalite Rubine D 4240: magenta pigment C. I. Pigment Red 57:1 (manufactured by BASF Corporation)

Irgalite Red L 3773: magenta pigment C. I. Pigment Red 48:4 (manufactured by BASF Corporation)

Cinquasia Pink K 4430 FP: magenta pigment C. I. Pigment Red 122 (manufactured by BASF Corporation)

<Preparation of Cyan Pigment Dispersion and Black Pigment Dispersion>

In the composition described in the following Table 4, 80 parts of components other than pigments were stirred with a mixer manufactured by SILVERSON (10 minutes to 15 minutes, 2,000 rpm to 3,000 rpm), thereby obtaining a uniform and transparent solution (dispersant diluent). Pigments were added to the transparent solution (dispersant diluent) and further stirred with the mixer (10 minutes to 20 minutes, 2,000 rpm to 3,000 rpm), thereby obtaining a uniform preliminary dispersion. Then, by using a circulation type beads mill apparatus (Laboratory Mini Mill) manufactured by EIGER TORRANCE LIMITED, dispersion processing was performed. The dispersion was performed using 100 parts of zirconia beads having a diameter of 0.65 mm, under the conditions of a circumferential speed of 15 m/s and a dispersion time of 30 minutes to 60 minutes.

TABLE 4

|  |  | CM1 | KM1 |
|---|---|---|---|
| Pigment | Heliogen Blue D 7110 F (PB 15:4) | 30 | — |
|  | MOGUL E (CB) | — | 40 |
| Dispersant | Polymer 1 | 10 | 10 |
| Monomer | 3MPDDA | 59.9 | 49.9 |
| Inhibitor | UV 22 | 0.1 | 0.1 |

The unit of the numerical values described in Table 4 is part by mass.

The pigments described in Table 4 are as follows.

Heliogen Blue D 7110 F: cyan pigment C. I. Pigment Blue 15:4 (PB 15:4, manufactured by BASF Corporation)

MOGUL E: black pigment C. I. Pigment Black 7 (carbon black (CB), manufactured by Cabot Corporation)

The amine value of the dispersant used in the present examples were measured. As a result, it was found that the amine value was 38.0 mgKOH/g for the polymer 1, 28.0 mgKOH/g for the polymer 2, 58.1 mgKOH/g for the polymer 3, and 10.3 mgKOH/g for Sol 32000.

The amine value was measured according to the following procedure. The dispersant was dissolved in methyl isobutyl ketone and subjected to potentiometric titration by using a 0.01 mol/L perchloric acid methyl isobutyl ketone solution, and the obtained value expressed using mgKOH/g is taken as an amine value. The potentiometric titration was performed using an automatic titrator COM-1500 manufactured by HIRANUMA SANGYO Co., LTD.

<Preparation of Ink and Preliminary Evaluation>

In the composition described in Tables 5 to 17, components other than the pigment dispersions were stirred with a mixer manufactured by SILVERSON (10 to 15 minutes, 2,000 to 3,000 rpm), thereby obtaining a uniform and transparent solution. The pigment dispersant prepared as above was added to the transparent solution and stirred (10 to 20 minutes, 2,000 to 3,000 rpm), thereby obtaining an ink. The prepared ink was subjected to filtration processing by using a 1.5 μm filter (manufactured by PALL CORPORATION). The unit of numerical values of each component in Tables 5 to 17 is part by pass.

After the ink was prepared, as preliminary evaluation, jetting properties, reflection density, and temporal stability at high temperature were evaluated. Only the ink that passed the preliminary evaluation was subjected to the final evaluation using the real printer.

Preliminary evaluation 1 (jetting properties): a jetting tester equipped with an ink jet head (Q-Class) manufactured by FUJIFILM Dimatix Inc was filled with the ink, and continuous jetting (printing rate: 90%) was performed for 20 minutes at a jetting frequency of 15 kHz. The continuous jetting was performed 10 times in total, and based on the average of the number of clogged nozzles per session of jetting, whether or not the ink is acceptable was determined. The evaluation criteria are as shown in Table 18. The inks evaluated to be excellent, good, and adequate were determined as being acceptable.

Preliminary evaluation 2 (reflection density): a white substrate (N YUPO 80, manufactured by Oji Tac Co., LTD.) was coated with the ink manually (by using a 12 μm coating bar) and cured under exposure conditions of 500 mJ/cm² to 1,000 mJ/cm², thereby preparing an evaluation sample. The reflection density was measured using a colorimeter (SpectroEye, manufactured by X-Rite, Incorporated., i0 model, observation light source: D 50, viewing angle: 2°). Based on the numerical values of the reflection density, whether or not the ink is acceptable was determined. The evaluation criteria are as shown in Table 18. The inks evaluated to be excellent, good, and adequate were determined as being acceptable.

Preliminary evaluation 3 (storage stability at high temperature): a glass bottle having a volume of 250 mL was filled with 220 g of the prepared ink, and stored for 4 weeks in a constant-temperature tank held at 60° C. By using a Brookfield viscometer (digital viscometer LVDV-1+, manufactured by Brookfield AMETEK), the viscosity of the ink was measured immediately after preparation and after a certain period of time. By calculating a rate of change of the viscosity after a certain period of time, whether or not the ink is acceptable was determined. The evaluation criteria are as shown in Table 18. The inks evaluated to be excellent, good, and adequate were determined as being acceptable.

TABLE 5

|  |  | Ink No. | | | | |
|---|---|---|---|---|---|---|
|  |  | Y1(5) | Y1(8) | Y1(10) | Y1(20) | Y1(25) |
| Monomer | 3MPDDA | 67.6 | 64.6 | 62.6 | 52.6 | 47.6 |
|  | DVE3 | 15.0 | 15.0 | 15.0 | 15.0 | 15.0 |
|  | TMPTA | 5.0 | 5.0 | 5.0 | 5.0 | 5.0 |
| Polymerization initiator | Irgacure 819 | 5.0 | 5.0 | 5.0 | 5.0 | 5.0 |
|  | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PY 185 dispersion YM1 | 5 | 8 | 10 | 20 | 25 |
| Preliminary evaluation | Jetting properties | Excellent | Excellent | Excellent | Excellent | Seriously inadequate |
|  | Manual coating (reflection density) | Inadequate | Adequate | Good | Excellent | Excellent |
|  | Storage stability at high temperature | Excellent | Excellent | Excellent | Excellent | Good |
|  | Note | Rejected | Acceptable | Acceptable | Acceptable | Rejected |

TABLE 6

| | | Ink No. | | | | |
|---|---|---|---|---|---|---|
| | | Y2(5) | Y2(8) | Y2(10) | Y2(20) | Y2(25) |
| Monomer | 3MPDDA | 67.6 | 64.6 | 62.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PY 151 dispersion YM2 | 5 | 8 | 10 | 20 | 25 |
| Preliminary evaluation | Jetting properties | Excellent | Excellent | Excellent | Adequate | Seriously inadequate |
| | Manual coating (reflection density) | Seriously inadequate | Seriously inadequate | Inadequate | Adequate | Excellent |
| | Storage stability at high temperature | Good | Good | Good | Good | Adequate |
| | Note | Rejected | Rejected | Rejected | Acceptable | Rejected |

TABLE 7

| | | Ink No. | | | | |
|---|---|---|---|---|---|---|
| | | Y3(5) | Y3(8) | Y3(10) | Y3(20) | Y3(25) |
| Monomer | 3MPDDA | 67.6 | 64.6 | 62.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PY 120 dispersion YM3 | 5 | 8 | 10 | 20 | 25 |
| Preliminary evaluation | Jetting properties | Excellent | Excellent | Excellent | Good | Seriously inadequate |
| | Manual coating (reflection density) | Seriously inadequate | Inadequate | Inadequate | Adequate | Excellent |
| | Storage stability at high temperature | Adequate | Adequate | Adequate | Adequate | Inadequate |
| | Note | Rejected | Rejected | Rejected | Acceptable | Rejected |

TABLE 8

| | | Ink No. | | | | |
|---|---|---|---|---|---|---|
| | | Y4(5) | Y4(8) | Y4(10) | Y4(20) | Y4(25) |
| Monomer | 3MPDDA | 67.6 | 64.6 | 62.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PY 185 dispersion YM4 | 5 | 8 | 10 | 20 | 25 |
| Preliminary evaluation | Jetting properties | Good | Good | Good | Adequate | Seriously inadequate |
| | Manual coating (reflection density) | Inadequate | Adequate | Good | Excellent | Excellent |
| | Storage stability at high temperature | Adequate | Adequate | Adequate | Adequate | Inadequate |
| | Note | Rejected | Acceptable | Acceptable | Acceptable | Rejected |

TABLE 9

| | | Ink No. | | | | |
|---|---|---|---|---|---|---|
| | | Y5(5) | Y5(8) | Y5(10) | Y5(20) | Y5(25) |
| Monomer | 3MPDDA | 67.6 | 64.6 | 62.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PY 185 dispersion YM5 | 5 | 8 | 10 | 20 | 25 |
| Preliminary evaluation | Jetting properties | Excellent | Excellent | Excellent | Excellent | Inadequate |
| | Manual coating (reflection density) | Inadequate | Adequate | Good | Excellent | Excellent |
| | Storage stability at high temperature | Good | Good | Good | Adequate | Adequate |
| | Note | Rejected | Acceptable | Acceptable | Acceptable | Rejected |

TABLE 10

| | | Ink No. | | | | |
|---|---|---|---|---|---|---|
| | | Y6(5) | Y6(8) | Y6(10) | Y6(20) | Y6(25) |
| Monomer | 3MPDDA | 67.6 | 64.6 | 62.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PY 185 dispersion YM6 | 5 | 8 | 10 | 20 | 25 |
| Preliminary evaluation | Jetting properties | Good | Good | Good | Adequate | Seriously inadequate |
| | Manual coating (reflection density) | Inadequate | Adequate | Good | Excellent | Excellent |
| | Storage stability at high temperature | Excellent | Excellent | Excellent | Excellent | Excellent |
| | Note | Rejected | Acceptable | Acceptable | Acceptable | Rejected |

TABLE 11

| | | Ink No. | | | | |
|---|---|---|---|---|---|---|
| | | M1(5) | M1(12) | M1(15) | M1(20) | M1(25) |
| Monomer | 3MPDDA | 67.6 | 60.6 | 57.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PR 57:1 dispersion MM1 | 5 | 12 | 15 | 20 | 25 |
| Preliminary evaluation | Jetting properties | Excellent | Excellent | Excellent | Good | Seriously inadequate |
| | Manual coating (reflection density) | Inadequate | Good | Excellent | Excellent | Excellent |
| | Storage stability at high temperature | Excellent | Excellent | Excellent | Good | Adequate |
| | Note | Rejected | Acceptable | Acceptable | Acceptable | Rejected |

TABLE 12

| | | Ink No. | | | | |
|---|---|---|---|---|---|---|
| | | M2(5) | M2(12) | M2(15) | M2(20) | M2(25) |
| Monomer | 3MPDDA | 67.6 | 60.6 | 57.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PR 48:4 dispersion MM2 | 5 | 12 | 15 | 20 | 25 |
| Preliminary evaluation | Jetting properties | Excellent | Good | Adequate | Inadequate | Seriously inadequate |
| | Manual coating (reflection density) | Seriously inadequate | Adequate | Good | Excellent | Excellent |
| | Storage stability at high temperature | Excellent | Excellent | Excellent | Good | Adequate |
| | Note | Rejected | Rejected | Acceptable | Rejected | Rejected |

TABLE 13

| | | Ink No. | | | | |
|---|---|---|---|---|---|---|
| | | M3(5) | M3(12) | M3(15) | M3(20) | M3(25) |
| Monomer | 3MPDDA | 67.6 | 60.6 | 57.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PR 122 dispersion MM3 | 5 | 12 | 15 | 20 | 25 |
| Preliminary evaluation | Jetting properties | Excellent | Excellent | Excellent | Inadequate | Seriously inadequate |
| | Manual coating (reflection density) | Seriously inadequate | Seriously inadequate | Inadequate | Adequate | Good |
| | Storage stability at high temperature | Adequate | Adequate | Adequate | Inadequate | Seriously inadequate |
| | Note | Rejected | Rejected | Rejected | Rejected | Rejected |

TABLE 14

| | | Ink No. | | | | |
|---|---|---|---|---|---|---|
| | | M4(5) | M4(12) | M4(15) | M4(20) | M4(25) |
| Monomer | 3MPDDA | 67.6 | 60.6 | 57.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PR 57:1 dispersion MM4 | 5 | 12 | 15 | 20 | 15 |
| Preliminary evaluation | Jetting properties | Good | Good | Good | Adequate | Seriously inadequate |
| | Manual coating (reflection density) | Inadequate | Good | Good | Excellent | Excellent |
| | Storage stability at high temperature | Adequate | Adequate | Adequate | Adequate | Inadequate |
| | Note | Rejected | Acceptable | Acceptable | Acceptable | Rejected |

TABLE 15

| | | Ink No. | | | | |
|---|---|---|---|---|---|---|
| | | M5(5) | M5(12) | M5(15) | M5(20) | M5(25) |
| Monomer | 3MPDDA | 67.6 | 60.6 | 57.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PR 57:1 dispersion MM5 | 5 | 12 | 15 | 20 | 25 |
| Preliminary evaluation | Jetting properties | Excellent | Excellent | Excellent | Good | Seriously inadequate |
| | Manual coating (reflection density) | Inadequate | Good | Good | Excellent | Excellent |
| | Storage stability at high temperature | Good | Good | Good | Good | Adequate |
| | Note | Rejected | Acceptable | Acceptable | Acceptable | Rejected |

TABLE 16

| | | Ink No. | | | | |
|---|---|---|---|---|---|---|
| | | M6(5) | M6(12) | M6(15) | M6(20) | M6(25) |
| Monomer | 3MPDDA | 67.6 | 60.6 | 57.6 | 52.6 | 47.6 |
| | DVE3 | 15.0 | 15.0 | 15.0 | 15.0 | 15.0 |
| | TMPTA | 5.0 | 5.0 | 5.0 | 5.0 | 5.0 |
| Polymerization initiator | Irgacure 819 | 5.0 | 5.0 | 5.0 | 5.0 | 5.0 |
| | Speedcure 7010 | 2.0 | 2.0 | 2.0 | 2.0 | 2.0 |
| Polymerization inhibitor | UV 22 | 0.3 | 0.3 | 0.3 | 0.3 | 0.3 |
| Surfactant | Byk 307 | 0.1 | 0.1 | 0.1 | 0.1 | 0.1 |
| Pigment dispersion | PR 57:1 dispersion MM6 | 5 | 12 | 15 | 20 | 25 |
| Preliminary evaluation | Jetting properties | Good | Good | Good | Adequate | Seriously inadequate |
| | Manual coating (reflection density) | Inadequate | Good | Good | Excellent | Excellent |
| | Storage stability at high temperature | Excellent | Excellent | Excellent | Excellent | Good |
| | Note | Rejected | Acceptable | Acceptable | Acceptable | Rejected |

TABLE 17

| Ink No. | | C | K |
|---|---|---|---|
| Monomer | 3MPDDA | 62.6 | 72.6 |
| | DVE3 | 15.0 | 15.0 |
| | TMPTA | 5.0 | 5.0 |
| Polymerization initiator | Irgacure 819 | 5.0 | 5.0 |
| | Speedcure 7010 | 2.0 | 2.0 |
| Polymerization inhibitor | UV 22 | 0.3 | 0.3 |
| Surfactant | Byk 307 | 0.1 | 0.1 |
| Pigment | Cyan dispersion CM1 | 10 | — |
| dispersion | Black dispersion KM1 | — | 8 |
| Preliminary evaluation | Jetting properties | Excellent | Excellent |
| | Manual coating (reflection density) | Excellent | Excellent |
| | Storage stability at high temperature | Excellent | Excellent |
| | Note | Acceptable | Acceptable |

TABLE 18

| | | Excellent | Good | Adequate | Inadequate | Seriously inadequate |
|---|---|---|---|---|---|---|
| Preliminary evaluation | Jetting properties | Less than 0.2 | Equal to or greater than 0.2 and less than 0.5 | Equal to or greater than 0.5 and less than 1.0 | Equal to or greater than 1.0 and less than 1.5 | Equal to or greater than 1.5 |

TABLE 18-continued

|  | Excellent | Good | Adequate | Inadequate | Seriously inadequate |
|---|---|---|---|---|---|
| Manual coating (reflection density): yellow ink | Equal to or greater than 2.0 | Equal to or greater than 1.9 and les than 2.0 | Equal to or greater than 1.8 and less than 1.9 | Equal to or greater than 1.6 and less than 1.8 | Less than 1.6 |
| Manual coating (reflection density): magenta ink | Equal to or greater than 1.9 | Equal to or greater than 1.8 and less than 1.9 | Equal to or greater than 1.7 and less than 1.8 | Equal to or greater than 1.5 and less than 1.7 | Less than 1.5 |
| Manual coating (reflection density): cyan ink | Equal to or greater than 2.2 | Equal to or greater than 2.1 and less than 2.2 | Equal to or greater than 2.0 and less than 2.1 | Equal to or greater than 1.8 and less than 2.0 | Less than 1.8 |
| Manual coating (reflection density): black ink | Equal to or greater than 2.0 | Equal to or greater than 1.9 and less than 2.0 | Equal to or greater than 1.8 and less than 1.9 | Equal to or greater than 1.6 and less than 1.8 | Less than 1.6 |
| Storage stability at high temperature | Less than 5% | Equal to or greater than 5% and less than 10% | Equal to or greater than 10% and less than 20% | Equal to or greater than 20% and less than 25% | Equal to or greater than 25% |

The details of the used components other than the above components are as follows. Herein, the same abbreviation as in the following description will be used below.

DVE3: triethylene glycol divinyl ether, manufactured by ISP Europe

TMPTA: trimethylolpropane acrylate, SR 350, manufactured by Sartomer

IRGACURE 819: bis(2,4,6-trimethylbenzoyl)phenylphosphine oxide, manufactured by BASF Corporation, molecular weight of 419

Speedcure 7010:
1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)]oxymethyl)propane, CAS No. 1003567-83-6, manufactured by Lambson Limited, molecular weight of 1,899

Byk 307: polydimethylsiloxane-based surfactant, BYK-307 manufactured by BYK Chemie GmbH <Printing Evaluation in Real Printer (Color Reproduction Range and Color Density)>

The inks evaluated to be acceptable by the preliminary evaluation described above were combined as shown in Tables 19 to 28, a real printer (Acuity Advance HS HD3545, manufactured by FUJIFILM Corporation) was filled with the inks, and samples used for evaluation of color reproduction range and color density were printed. As a cyan ink and a black ink, the ink C and the ink K described in Table 17 were used. As a substrate, a white substrate (N YUPO 80, manufactured by Oji Tac Co., LTD.) was used.

For the analysis of the color reproduction range (secondary color), commercially available color management software (Production server 7, manufactured by ColorGATE) WAS USED. For the printed image used for analysis, CMYK Profiling Target A4 (Eye One i0) included in the aforementioned software was used. The colorimetry was performed using a commercially available colorimeter (Eye One i0, GretagMacbeth). Among the results of the colorimetry, chroma C (Red) and C (Blue) in a blue region ($a^*>0$, $b^*<0$) and a red region ($a^*>0$, $b^*>0$) at the time when the L value became 30, 50, and 70 were read by the aforementioned software, thereby evaluating the color reproduction range.

As samples used for the analysis of the color reproduction range (secondary color) and the evaluation of the color density, the samples printed under the conditions of yellow 100%, magenta 100%, red 100%, blue 100%, and green 100% were used. Herein, "100%" is a condition of a maximum amount of ink obtained in a case where printing is performed based on the printing conditions of a KI ink series (KI 867, KI 215, and KI 052 manufactured by FUJIFILM Specialty Ink Systems Ltd.) as standard inks of the same printer. The colorimetry was performed using a commercially available colorimeter (Eye One i0, Gretag-Macbeth).

The evaluation criteria of the color reproducibility and the color density are as shown in Table 29. The inks evaluated to be excellent, good, and adequate were determined as being acceptable.

<Continuous Printing Stability>

The inks determined as being acceptable by the preliminary evaluation described above were combined as shown in Tables 19 to 28, a real printer (Acuity Advance HS HD3545, manufactured by FUJIFILM Corporation) was filled with the inks, and 10 sheets of 4 color-black (printing condition: 100% for all colors) large-sized images (size: 1.2 m×2.0 m) were printed. In order to evaluate continuous printing stability, the number of clogged nozzles was recorded during printing. The evaluation criteria of the continuous printing stability are as shown in Table 29. The inks evaluated to be excellent, good, and adequate were determined as being acceptable.

TABLE 19

|  |  | Example 1 |  | Example 2 |  | Example 3 |  |
|---|---|---|---|---|---|---|---|
| Yellow ink | Ink No. | Y1 (8) | | Y1 (10) | | Y1 (20) | |
|  | Pigment | PY 185 | 1.6 wt % | PY 185 | 2.0 wt % | PY 185 | 4.0 wt % |
|  | Dispersant | Polymer 1 | | Polymer 1 | | Polymer 1 | |
| Magenta ink | Ink No. | M1 (15) | | M1 (15) | | M1 (15) | |
| Color reproducibility | L = 30 C (Red) | 59.7 | Adequate | 63.1 | Excellent | 66.2 | Excellent |
|  | C (Blue) | 56.0 | Excellent | 54.5 | Excellent | 55.7 | Excellent |
|  | L = 50 C (Red) | 73.9 | Good | 78.1 | Excellent | 81.9 | Excellent |
|  | C (Blue) | 70.5 | Excellent | 70.1 | Excellent | 70.0 | Excellent |
|  | L = 70 C (Red) | 72.1 | Good | 76.2 | Excellent | 79.9 | Excellent |
|  | C (Blue) | 38.5 | Excellent | 37.3 | Excellent | 38.0 | Excellent |
|  | Y solid color C (Yellow) | 101.5 | Adequate | 107.2 | Excellent | 112.4 | Excellent |
|  | M solid color C (Magenta) | 78.0 | Excellent | 78.9 | Excellent | 78.4 | Excellent |
| Color density | R secondary color | 2.1 | Good | 2.1 | Good | 2.2 | Excellent |
|  | Y solid color | 1.8 | Good | 1.9 | Excellent | 2.1 | Excellent |
|  | M solid color | 1.7 | Good | 1.7 | Good | 1.7 | Good |
| Continuous printing stability | M | Excellent | | Excellent | | Adequate | |
|  | Y | Excellent | | Excellent | | Adequate | |

TABLE 20

|  |  | Comparative example 1 |  | Comparative example 2 |  |
|---|---|---|---|---|---|
| Yellow ink | Ink No. | Y2 (20) | | Y3 (20) | |
|  | Pigment | PY 151 | 4.0 wt % | PY 120 | 4.0 wt % |
|  | Dispersant | Polymer 1 | | Polymer 1 | |
| Magenta ink | Ink No. | M1 (15) | | M1 (15) | |
| Color reproducibility | L = 30 C (Red) | 53.0 | Inadequate | 53.6 | Inadequate |
|  | C (Blue) | 55.1 | Excellent | 55.4 | Excellent |
|  | L = 50 C (Red) | 65.6 | Inadequate | 65.9 | Inadequate |
|  | C (Blue) | 70.8 | Excellent | 70.1 | Excellent |
|  | L = 70 C (Red) | 64.0 | Inadequate | 64.8 | Inadequate |
|  | C Blue | 39.0 | Excellent | 38.1 | Excellent |
|  | Y solid color C (Yellow) | 90.1 | Inadequate | 91.1 | Inadequate |
|  | M solid color C (Magenta) | 77.3 | Good | 78.9 | Excellent |
| Color density | R secondary color | 2.0 | Adequate | 2.0 | Adequate |
|  | Y solid color | 1.7 | Adequate | 1.7 | Adequate |
|  | M solid color | 1.7 | Good | 1.7 | Good |
| Continuous printing stability | M | Adequate | | Adequate | |
|  | Y | Adequate | | Adequate | |

TABLE 21

|  |  | Example 4 |  | Example 5 |  | Example 6 |  |
|---|---|---|---|---|---|---|---|
| Yellow ink | Ink No. | Y4 (8) | | Y4 (10) | | Y4 (20) | |
|  | Pigment | PY 185 | 1.6 wt % | PY 185 | 2.0 wt % | PY 185 | 4.0 wt % |
|  | Dispersant | Sol 32000 | | Sol 32000 | | Sol 32000 | |
| Magenta ink | Ink No. | M1 (15) | | M1 (15) | | M1 (15) | |
| Color reproducibility | L = 30 C (Red) | 58.9 | Adequate | 62.0 | Good | 65.5 | Excellent |
|  | C (Blue) | 55.2 | Excellent | 54.8 | Good | 54.8 | Excellent |
|  | L = 50 C (Red) | 72.9 | Good | 76.7 | Good | 81.0 | Excellent |
|  | C (Blue) | 69.8 | Good | 70.6 | Excellent | 69.6 | Good |
|  | L = 70 C (Red) | 71.2 | Good | 74.8 | Good | 79.0 | Excellent |
|  | C (Blue) | 38.8 | Excellent | 38.8 | Excellent | 38.2 | Excellent |
|  | Y solid color C (Yellow) | 100.1 | Adequate | 105.3 | Good | 111.2 | Excellent |
|  | M solid color C (Magenta) | 78.8 | Excellent | 78.4 | Excellent | 77.5 | Good |
| Color density | R secondary color | 2.1 | Good | 2.1 | Good | 2.2 | Excellent |
|  | Y solid color | 1.8 | Good | 1.9 | Excellent | 2.1 | Excellent |
|  | M solid color | 1.7 | Good | 1.7 | Good | 1.7 | Good |
| Continuous printing stability | M | Excellent | | Excellent | | Adequate | |
|  | Y | Excellent | | Excellent | | Adequate | |

TABLE 22

|  |  |  | Example 7 |  | Example 8 |  | Example 9 |  |
|---|---|---|---|---|---|---|---|---|
| Yellow ink |  | Ink No. | Y5 (8) |  | Y5 (10) |  | Y5 (20) |  |
|  |  | Pigment | PY 185 | 1.6 wt % | PY 185 | 2.0 wt % | PY 185 | 4.0 wt % |
|  |  | Dispersant | Polymer 2 |  | Polymer 2 |  | Polymer 2 |  |
| Magenta ink |  | Ink No. | M1 (15) |  | M1 (15) |  | M1 (15) |  |
| Color reproducibility | L = 30 | C (Red) | 59.7 | Adequate | 63.0 | Excellent | 66.0 | Excellent |
|  |  | C (Blue) | 55.5 | Excellent | 55.6 | Excellent | 55.0 | Excellent |
|  | L = 50 | C (Red) | 73.9 | Good | 78.0 | Excellent | 81.7 | Excellent |
|  |  | C (Blue) | 70.0 | Excellent | 69.8 | Good | 70.6 | Excellent |
|  | L = 70 | C (Red) | 72.1 | Good | 76.1 | Excellent | 79.8 | Excellent |
|  |  | C (Blue) | 38.0 | Excellent | 38.3 | Excellent | 37.6 | Excellent |
|  | Y solid color | C (Yellow) | 101.4 | Adequate | 107.0 | Excellent | 112.2 | Excellent |
|  | M solid color | C (Magenta) | 78.6 | Excellent | 78.8 | Excellent | 77.4 | Good |
| Color density | R secondary color |  | 2.1 | Good | 2.1 | Good | 2.2 | Excellent |
|  | Y solid color |  | 1.8 | Good | 1.9 | Excellent | 2.1 | Excellent |
|  | M solid color |  | 1.7 | Good | 1.7 | Good | 1.7 | Good |
| Continuous printing stability | M |  | Excellent |  | Excellent |  | Adequate |  |
|  | Y |  | Excellent |  | Excellent |  | Adequate |  |

TABLE 23

|  |  |  | Example 10 |  | Example 11 |  | Example 12 |  |
|---|---|---|---|---|---|---|---|---|
| Yellow ink |  | Ink No. | Y5 (8) |  | Y5 (10) |  | Y5 (20) |  |
|  |  | Pigment | PY 185 | 1.6 wt % | PY 185 | 2.0 wt % | PY 185 | 4.0 wt % |
|  |  | Dispersant | Polymer 3 |  | Polymer 3 |  | Polymer 3 |  |
| Magenta ink |  | Ink No. | M1 (15) |  | M1 (15) |  | M1 (15) |  |
| Color reproducibility | L = 30 | C (Red) | 59.5 | Adequate | 62.5 | Excellent | 65.9 | Excellent |
|  |  | C (Blue) | 55.8 | Excellent | 54.8 | Excellent | 55.9 | Excellent |
|  | L.= 50 | C (Red) | 73.7 | Good | 77.4 | Excellent | 81.6 | Excellent |
|  |  | C (Blue) | 69.6 | Good | 69.7 | Good | 71.1 | Excellent |
|  | L = 70 | C (Red) | 71.9 | Good | 75.5 | Excellent | 79.6 | Excellent |
|  |  | C (Blue) | 37.5 | Excellent | 38.7 | Excellent | 39.0 | Excellent |
|  | Y solid color | C (Yellow) | 101.1 | Adequate | 106.2 | Excellent | 112.0 | Excellent |
|  | M solid color | C (Magenta) | 78.7 | Excellent | 77.8 | Good | 78.7 | Excellent |
| Color density | R secondary color |  | 2.1 | Good | 2.1 | Good | 2.2 | Excellent |
|  | Y solid color |  | 1.8 | Good | 1.9 | Excellent | 2.1 | Excellent |
|  | M solid color |  | 1.7 | Good | 1.7 | Good | 1.7 | Good |
| Continuous printing stability | M |  | Excellent |  | Excellent |  | Adectuate |  |
|  | Y |  | Excellent |  | Excellent |  | Adequate |  |

TABLE 24

|  |  |  | Example 13 |  | Example 14 |  | Example 15 |  |
|---|---|---|---|---|---|---|---|---|
| Magenta ink |  | Ink No. | M1 (12) |  | M1 (15) |  | M1 (20) |  |
|  |  | Pigment | PR 57:1 | 2.4 wt % | PR 57:1 | 3.0 wt % | PR 57:1 | 4.0 wt % |
|  |  | Dispersant | Polymer 1 |  | Polymer 1 |  | Polymer 1 |  |
| Yellow ink |  | Ink No. | Y1 (10) |  | Y1 (10) |  | Y1 (10) |  |
| Color reproducibility | L = 30 | C (Red) | 56.8 | Adequate | 63.1 | Excellent | 64.4 | Excellent |
|  |  | C (Blue) | 44.3 | Adequate | 55.4 | Excellent | 58.2 | Excellent |
|  | L = 50 | C (Red) | 70.3 | Good | 78.1 | Excellent | 79.6 | Excellent |
|  |  | C (Blue) | 56.0 | Adequate | 70.1 | Excellent | 73.6 | Excellent |
|  | L = 70 | C (Red) | 68.4 | Adequate | 76.2 | Excellent | 77.7 | Excellent |
|  |  | C (Blue) | 30.5 | Adequate | 38.1 | Excellent | 40.0 | Excellent |
|  | Y solid color | C (Yellow) | 107.3 | Excellent | 107.3 | Excellent | 106.9 | Excellent |
|  | M solid color | C (Magenta) | 75.2 | Adequate | 78.0 | Excellent | 81.3 | Excellent |
| Color density | R secondary color |  | 2.0 | Adequate | 2.1 | Good | 2.3 | Excellent |
|  | Y solid color |  | 1.9 | Excellent | 1.9 | Excellent | 1.9 | Excellent |
|  | M solid color |  | 1.6 | Adequate | 1.7 | Good | 1.9 | Excellent |
| Continuous printing stability | M |  | Excellent |  | Excellent |  | Adequate |  |
|  | Y |  | Excellent |  | Excellent |  | Adequate |  |

TABLE 25

|  |  |  | Comparative example 3 |  | Comparative example 4 |  |
|---|---|---|---|---|---|---|
| Magenta ink |  | Ink No. | M2 (12) |  | M2 (15) |  |
|  |  | Pigment | PR 48:4 | 2.4 wt % | PR 48:4 | 3.0 wt % |
|  |  | Dispersant | Polymer 1 |  | Polymer 1 |  |
| Yellow ink |  | Ink No. | Y1 (10) |  | Y1 (10) |  |
| Color reproducibility | L = 30 | C (Red) | 52.6 | Inadequate | 58.4 | Adequate |
|  |  | C (Blue) | 29.1 | Inadequate | 36.2 | Inadequate |
|  | L = 50 | C (Red) | 76.6 | Good | 85.0 | Excellent |
|  |  | C (Blue) | 40.2 | Inadequate | 50.2 | Inadequate |
|  | L = 70 | C (Red) | 70.5 | Good | 78.3 | Excellent |
|  |  | C (Blue) | 32.0 | Adequate | 41.2 | Excellent |
|  | Y solid color | C (Yellow) | 106.6 | Excellent | 107.8 | Excellent |
|  | M solid color | C (Magenta) | 79.4 | Excellent | 82.2 | Excellent |
| Color density | R secondary color |  | 1.9 | Inadequate | 2.0 | Adequate |
|  | Y solid color |  | 1.9 | Excellent | 1.9 | Excellent |
|  | M solid color |  | 1.5 | Adequate | 1.6 | Adequate |
| Continuous printing stability | M |  | Excellent |  | Good |  |
|  | Y |  | Excellent |  | Good |  |

TABLE 26

|  |  |  | Example 16 |  | Example 17 |  | Example 18 |  |
|---|---|---|---|---|---|---|---|---|
| Magenta ink |  | Ink No. | M4 (12) |  | M4 (15) |  | M4 (20) |  |
|  |  | Pigment | PR 57:1 | 2.4 wt % | PR 57:1 | 3.0 wt % | PR 57:1 | 4.0 wt % |
|  |  | Dispersant | Sol 32000 |  | Sol 32000 |  | Sol 32000 |  |
| Yellow ink |  | Ink No. | Y1 (10) |  | Y1 (10) |  | Y1 (10) |  |
| Color reproducibility | L = 30 | C (Red) | 54.0 | Adequate | 60.0 | Good | 62.0 | Good |
|  |  | C (Blue) | 42.1 | Adequate | 52.6 | Good | 55.3 | Excellent |
|  | L = 50 | C (Red) | 66.8 | Adequate | 74.2 | Good | 76.5 | Good |
|  |  | C (Blue) | 53.2 | Adequate | 66.6 | Good | 70.0 | Excellent |
|  | L = 70 | C (Red) | 65.0 | Adequate | 72.4 | Good | 73.4 | Good |
|  |  | C (Blue) | 29.0 | Adequate | 36.2 | Good | 38.0 | Excellent |
|  | Y solid color | C (Yellow) | 107.8 | Excellent | 106.6 | Excellent | 107.1 | Excellent |
|  | M solid color | C (Magenta) | 73.1 | Adequate | 74.9 | Good | 77.9 | Good |
| Color density | R secondary color |  | 2.0 | Adequate | 2.1 | Good | 2.3 | Excellent |
|  | Y solid color |  | 1.9 | Excellent | 1.9 | Excellent | 1.9 | Excellent |
|  | M solid color |  | 1.6 | Adequate | 1.7 | Good | 1.9 | Excellent |
| Continuous printing stability | M |  | Excellent |  | Good |  | Adequate |  |
|  | Y |  | Excellent |  | Good |  | Adequate |  |

TABLE 27

|  |  |  | Example 19 |  | Example 20 |  | Example 21 |  |
|---|---|---|---|---|---|---|---|---|
| Magenta ink |  | Ink No. | M5 (12) |  | M5 (15) |  | M5 (20) |  |
|  |  | Pigment | PR 57:1 | 2.4 wt % | PR 57:1 | 3.0 wt % | PR 57:1 | 4.0 wt % |
|  |  | Dispersant | Polymer 2 |  | Polymer 2 |  | Polymer 2 |  |
| Yellow ink |  | Ink No. | Y1 (10) |  | Y1 (10) |  | Y1 (10) |  |
| Color reproducibility | L = 30 | C (Red) | 56.8 | Adequate | 63.1 | Excellent | 64.4 | Excellent |
|  |  | C (Blue) | 44.3 | Adequate | 55.3 | Excellent | 58.1 | Excellent |
|  | L = 50 | C (Red) | 70.4 | Good | 77.9 | Good | 79.6 | Excellent |
|  |  | C Blue | 56.0 | Adequate | 70.3 | Excellent | 73.7 | Excellent |
|  | L = 70 | C (Red) | 68.3 | Adequate | 76.4 | Excellent | 77.7 | Excellent |
|  |  | C (Blue) | 30.5 | Adequate | 38.3 | Excellent | 40.1 | Excellent |
|  | Y solid color | C (Yellow) | 107.1 | Excellent | 107.4 | Excellent | 108.1 | Excellent |
|  | M solid color | C (Magenta) | 75.4 | Adequate | 77.7 | Good | 80.9 | Excellent |
| Color density | R secondary color |  | 2.0 | Adegate | 2.1 | Good | 2.3 | Excellent |
|  | Y solid color |  | 1.9 | Excellent | 1.9 | Excellent | 1.9 | Excellent |
|  | M solid color |  | 1.6 | Adequate | 1.7 | Good | 1.9 | Excellent |
| Continuous printing stability | M |  | Excellent |  | Excellent |  | Adequate |  |
|  | Y |  | Excellent |  | Excellent |  | Adequate |  |

TABLE 28

|  |  | Example 22 | | Example 23 | | Example 24 | |
|---|---|---|---|---|---|---|---|
| Magenta ink | Ink No. | M6 (12) | | M6 (15) | | M6 (20) | |
|  | Pigment | PR 57:1 | 2.4 wt % | PR 57:1 | 3.0 wt % | PR 57:1 | 4.0 wt % |
|  | Dispersant | Polymer 3 | | Polymer 3 | | Polymer 3 | |
| Yellow ink | Ink No. | Y1 (10) | | Y1 (10) | | Y1 (10) | |
| Color reproducibility | L = 30 C (Red) | 56.6 | Adequate | 62.9 | Good | 64.5 | Excellent |
|  | C (Blue) | 44.2 | Adequate | 55.0 | Excellent | 58.1 | Excellent |
|  | L = 50 C (Red) | 70.3 | Good | 77.7 | Good | 79.6 | Excellent |
|  | C (Blue) | 55.9 | Adequate | 70.1 | Excellent | 73.6 | Excellent |
|  | L = 70 C (Red) | 68.2 | Adequate | 75.9 | Excellent | 77.5 | Excellent |
|  | C (Blue) | 30.4 | Adequate | 38.2 | Excellent | 39.1 | Excellent |
|  | Y solid color C (Yellow) | 106.2 | Excellent | 106.6 | Excellent | 108.0 | Excellent |
|  | M solid color C (Magenta) | 74.8 | Adequate | 77.6 | Good | 81.2 | Excellent |
| Color density | R secondary color | 2.0 | Adequate | 2.1 | Good | 2.3 | Excellent |
|  | Y solid color | 1.9 | Excellent | 1.9 | Excellent | 1.9 | Excellent |
|  | M solid color | 1.6 | Adequate | 1.7 | Good | 1.9 | Excellent |
| Continuous printing stability | M | Excellent | | Good | | Adequate | |
|  | Y | Excellent | | Good | | Adequate | |

TABLE 29

|  |  |  | Excellent | Good | Adequate | Inadequate |
|---|---|---|---|---|---|---|
| Color reproducibility | L = 30 | C (Red) | Equal to or greater than 63 | Equal to or greater than 60 and less than 63 | Equal to or greater than 54 and less than 60 | Less than 54 |
|  |  | C (Blue) | Equal to or greater than 54 | Equal to or greater than 50 and less than 54 | Equal to or greater than 40 and less than 50 | Less than 40 |
|  | L = 50 | C (Red) | Equal to or greater than 78 | Equal to or greater than 70 and less than 78 | Equal to or greater than 66 and less than 70 | Less than 66 |
|  |  | C (Blue) | Equal to or greater than 70 | Equal to or greater than 60 and less than 70 | Equal to or greater than 52 and less than 60 | Less than 52 |
|  | L = 70 | C (Red) | Equal to or greater than 75 | Equal to or greater than 70 and less than 75 | Equal to or greater than 65 and less than 70 | Less than 65 |
|  |  | C (Blue) | Equal to or greater than 37 | Equal to or greater than 33 and less than 37 | Equal to or greater than 29 and less than 33 | Less than 29 |
|  | Y solid color | C (Yellow) | Equal to or greater than 106 | Equal to or greater than 103 and less than 106 | Equal to or greater than 100 and less than 103 | Less than 100 |
|  | M solid color | C (Magenta) | Equal to or greater than 78 | Equal to or greater than 76 and less than 78 | Equal to or greater than 73 and less than 76 | Less than 73 |
| Color density | R secondary color |  | Equal to or greater than 2.2 | Equal to or greater than 2.1 and less than 2.2 | Equal to or greater than 2.0 and less than 2.1 | Less than 2.0 |
|  | Y solid color |  | Equal to or greater than 1.9 | Equal to or greater than 1.8 and less than 1.9 | Equal to or greater than 1.7 and less than 1.8 | Less than 1.7 |
|  | M solid color |  | Equal to or greater than 1.8 | Equal to or greater than 1.7 and less than 1.8 | Equal to or greater than 1.5 and less than 1.7 | Less than 1.5 |
| Continuous printing stability |  |  | 0 or 1 | 2 or 3 | 4 or 5 | Greater than 5 |

<Preparation and Evaluation of Ink>

In the composition described in Table 30, the components other than pigment dispersions were stirred with a mixer manufactured by SILVERSON (10 to 15 minutes, 2,000 to 3,000 rpm), thereby obtaining a uniform and transparent solution. The pigment dispersion prepared as above was added to the transparent solution, followed by stirring (10 to 20 minutes, 2,000 to 3,000 rpm), thereby obtaining an ink. The prepared ink was subjected to filtration processing by using a 1.5 cm filter (manufactured by PALL CORPORATION). The unit of numerical values of each component in Table 30 is part by pass.

The inks determined as being acceptable by the preliminary evaluation described above were combined as shown in Table 30, a real printer (ACUITY ADVANCE HS HD3545, manufactured by FUJIFILM Corporation) was filled with the inks, and samples used for evaluation of color reproduction range and color density were printed. As a cyan ink and a black ink, the ink C and the ink K described in Table 17 were used. As a substrate, a white substrate (N YUPO 80, manufactured by Oji Tac Co., LTD.) was used.

Evaluation method (jetting properties and color reproduction range): among the evaluation items, the color reproduction range and the continuous printing stability were evaluated by the same method as used for the inks in Tables 19 to 28. The evaluation criteria of the color reproduction range and the continuous printing stability are as shown in Table 31. The inks evaluated to be excellent, good, and adequate were determined as being acceptable.

Evaluation method (odor): by using a real printer (ACUITY ADVANCE HS HD3545, manufactured by FUJIFILM Corporation), 10 cm×10 cm printed materials were prepared under the condition of red 100%. Within 10 minutes after the end of the printing, each of the printed material was put into a large-mouthed glass bottle having a volume of 500 mL, and the bottle was sealed and left to stand for 3 days. After 3 days, the odor was assessed by sensory evaluation. The odor was evaluated by counting the number of peoples who sense malodor. The evaluation criteria are as shown in Table 31. The inks evaluated to be excellent, good, and adequate were determined as being acceptable.

Evaluation method (storage stability at room temperature (filtration)): a glass bottle having a volume of 250 mL was filled with 220 g of the prepared ink and stored for 50 weeks in a constant-temperature bath held at 25° C. After 50 weeks, a filtration time (filtration time for 10 mL and 50 mL, T (10) and T (50)) was measured. As a filter, a polypropylene filter disc (PEPLYN PLUS series (diameter: 25 mm, accuracy: 7 μm), manufactured by Parker Hannifin Corp) was used. During filtration, the internal pressure of the container was set to be 400 mBar (40 kPa). Furthermore, the ink was stored for about 30 minutes in the constant-temperature tank such that the temperature of the ink became 25° C. immediately before the filtration. Based on the values calculated by the following equation, whether or not the storage stability (filtration) at room temperature of the ink is acceptable was determined. The evaluation criteria are as shown in Table 30. The inks evaluated to be excellent, good, and adequate were determined as being acceptable.

Filtration properties (filtration index)=$T(50) \div (T(10) \times 5)$

TABLE 30

| Ink set No. | | YM ink set 1 | | YM ink set 2 | | YM ink set 3 | | YM ink set 4 | |
| --- | --- | --- | --- | --- | --- | --- | --- | --- | --- |
| Monomer | 3MPDDA | 62.6 | 57.6 | 62.6 | 57.6 | 77.6 | 72.6 | 60.6 | 55.6 |
| | DVE3 | 15.0 | 15.0 | — | — | — | — | 15.0 | 15.0 |
| | TMPTA | 5.0 | 5.0 | 5.0 | 5.0 | 5.0 | 5.0 | 5.0 | 5.0 |
| | VEEA | — | — | 15.0 | 15.0 | — | — | — | — |
| | PEA | — | — | — | — | — | — | 2.0 | 2.0 |
| Polymerization initiator | Irgacure 819 | 5.0 | 5.0 | 5.0 | 5.0 | 5.0 | 5.0 | 5.0 | 5.0 |
| | Speedcure 7010 | 2.0 | 2.0 | 2.0 | 2.0 | 2.0 | 2.0 | 2.0 | 2.0 |
| Polymerization inhibitor | UV 22 | 0.3 | 0.3 | 0.3 | 0.3 | 0.3 | 0.3 | 0.3 | 0.3 |
| Surfactant | Byk 307 | 0.1 | 0.1 | 0.1 | 0.1 | 0.1 | 0.1 | 0.1 | 0.1 |
| Pigment dispersion | PY 185 dispersion YM1 | 10 | — | 10 | — | 10 | — | 10 | — |
| | PR 57:1 dispersion MM1 | — | 15 | — | 15 | — | 15 | — | 15 |
| Evaluation | Color reproduction range | Excellent in all regions | | Excellent in all regions | | Excellent in all regions | | Excellent in all regions | |
| | Continuous printing stability | Excellent | | Excellent | | Excellent | | Excellent | |
| | Odor | Excellent | | Adequate | | Excellent | | Excellent | |
| | Storage satbility at room temperature (filtration) | Excellent | | Good | | Adequate | | Good | |

TABLE 31

| | | | Excellent | Good | Adequate | Inadequate |
| --- | --- | --- | --- | --- | --- | --- |
| Color reproducibility | L = 30 | C (Red) | Equal to or greater than 63 | Equal to or reater than 60 and less than 63 | Equal to or greater than 54 and less than 60 | Less than 54 |
| | | C (Blue) | Equal to or greater than 54 | Equal to or greater than 50 and less than 54 | Equal to or greater than 40 and less than 50 | Less than 40 |
| | L = 50 | C (Red) | Equal to or greater than 78 | Equal to or greater than 70 and less than 78 | Equal to or greater than 66 and less than 70 | Less than 66 |
| | | C (Blue) | Equal to or greater than 70 | Equal to or greater than 60 and less than 70 | Equal to or greater than 52 and less than 60 | Less than 52 |

TABLE 31-continued

| | | Excellent | Good | Adequate | Inadequate |
|---|---|---|---|---|---|
| L = 70 | C (Red) | Equal to or greater than 75 | Equal to or greater than 70 and less than 75 | Equal to or greater than 65 and less than 70 | Less than 65 |
| | C (Blue) | Equal to or greater than 37 | Equal to or greater than 33 and less than 37 | Equal to or greater than 29 and less than 33 | Less than 29 |
| Y solid color | C (Yellow) | Equal to or greater than 106 | Equal to or greater than 103 and less than 106 | Equal to or greater than 100 and less than 103 | Less than 100 |
| M solid color | C (Magenta) | Equal to or greater than 78 | Equal to or greater than 76 and less than 78 | Equal to or greater than 73 and less than 76 | Less than 73 |
| Continuous printing stability | | 0 or 1 | 2 or 3 | 4 or 5 | Greater than 5 |
| Odor | | 0 or 1 person | 2 or 3 people | 4 or 5 people | Greater than 5 people |
| Storage stability at room temperature (filtration) | | Less than 1.1 | Equal to or greater than 1.1 and less than 1.5 | Equal to or greater than 1.5 and less than 2.0 | Equal to or greater than 2.0 |

The components described in Table 30 other than the components described above are as follows.

VEEA: 2-(2-hydroxyethoxy)ethyl acrylate, manufactured by NIPPON SHOKUBA CO., LTD.

PEA: phenoxyethyl acrylate, SR339C manufactured by Sartomer

What is claimed is:

1. A radiation curable type ink jet ink set comprising:
a magenta ink which contains C. I. Pigment Red 57:1 in an amount of 2.0% by mass to 4.0% by mass; and
a yellow ink which contains C. I. Pigment Yellow 185 in an amount of 1.5% by mass to 4.0% by mass,
wherein both of the magenta ink and the yellow ink further contain a radical polymerization initiator.

2. The radiation curable type ink jet ink set according to claim 1,
wherein both of the magenta ink and the yellow ink contain a polymer dispersant having an amine value of 35 mgKOH/g to 45 mgKOH/g.

3. The radiation curable type ink jet ink set according to claim 2,
wherein the polymer dispersant is a copolymer having a monomer unit represented by the following Formula (1),

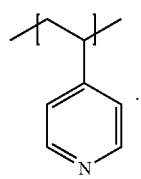

(1)

4. The radiation curable type ink jet ink set according to claim 3,
wherein in a case where the total content of the monomer units constituting the polymer dispersant is 100 mol %, the content of the monomer unit represented by Formula (1) in the polymer dispersant is 10 mol % to 30 mol %.

5. The radiation curable type ink jet ink set according to claim 3,
wherein both of the magenta ink and the yellow ink further contain a polyfunctional ethylenically unsaturated compound having one or more vinyl ether groups.

6. The radiation curable type ink jet ink set according to claim 3,
wherein both of the magenta ink and the yellow ink further contain a trifunctional (meth)acrylate compound.

7. The radiation curable type ink jet ink set according to claim 2,
wherein the polymer dispersant is a copolymer having a monomer unit represented by the following Formula (1), a monomer unit represented by the following Formula (2), and a monomer unit represented by the following Formula (3),

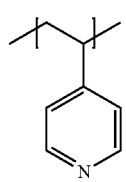

(1)

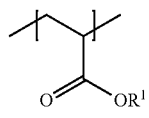

(2)

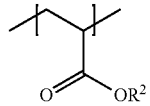

(3)

in the formulae, $R^1$ represents an alkyl group having 2 to 15 carbon atoms, and $R^2$ represents a polyalkylene oxide group having 10 to 50 carbon atoms that has a hydroxy group or an alkoxy group on a terminal.

8. The radiation curable type ink jet ink set according to claim 2, wherein in a case where the content of C. I. Pigment Red 57:1 or C. I. Pigment Yellow 185 is denoted as Mp, and the content of the polymer dispersant is denoted as Md, a mass ratio of Md/Mp in each of the magenta ink and the yellow ink is 0.2 to 0.5.

9. The radiation curable type ink jet ink set according to claim 2,
wherein both of the magenta ink and the yellow ink further contain a polyfunctional ethylenically unsaturated compound having one or more vinyl ether groups.

10. The radiation curable type ink jet ink set according to claim 2,
wherein both of the magenta ink and the yellow ink further contain a trifunctional (meth)acrylate compound.

11. The radiation curable type ink jet ink set according to claim 1,
wherein both of the magenta ink and the yellow ink further contain a polyfunctional ethylenically unsaturated compound having one or more vinyl ether groups.

12. The radiation curable type ink jet ink set according to claim 11,
wherein the polyfunctional ethylenically unsaturated compound having one or more vinyl ether groups is a polyfunctional ethylenically unsaturated compound having two or more vinyl ether groups.

13. The radiation curable type ink jet ink set according to claim 11,
wherein both of the magenta ink and the yellow ink further contain a trifunctional (meth)acrylate compound.

14. The radiation curable type ink jet ink set according to claim 1,
wherein both of the magenta ink and the yellow ink further contain 3-methyl-1,5-pentanediol diacrylate.

15. The radiation curable type ink jet ink set according to claim 14,
wherein the content of the 3-methyl-1,5-pentanediol diacrylate in each of the magenta ink and the yellow ink is equal to or greater than 50% by mass.

16. The radiation curable type ink jet ink set according to claim 14,
wherein the content of the 3-methyl-1,5-pentanediol diacrylate in each of the magenta ink and the yellow ink is 50% by mass to 75% by mass.

17. The radiation curable type ink jet ink set according to claim 1,
wherein both of the magenta ink and the yellow ink further contain a trifunctional (meth)acrylate compound.

18. The radiation curable type ink jet ink set according to claim 1 that is a radiation curable type ink jet ink set for a printed material used indoors.

19. The radiation curable type ink jet ink set according to claim 1,
wherein the content of the radical polymerization initiator in each of the magenta ink and the yellow ink is 1.0% by mass to 15.0% by mass.

20. An ink jet recording method comprising:
(1) jetting the magenta ink and the yellow ink contained in the radiation curable type ink jet ink set according to claim 1 onto a substrate from an ink jet recording head; and
(2) curing the jetted magenta ink and the yellow ink by radiation irradiation.

21. The ink jet recording method according to claim 20, wherein a printed material for indoor use is obtained.

* * * * *